(12) United States Patent
Shinbutsu et al.

(10) Patent No.: US 11,293,476 B2
(45) Date of Patent: Apr. 5, 2022

(54) DUAL-THREADED SCREW STRUCTURE AND FASTENING STRUCTURE THEREWITH

(71) Applicant: FORM ROLL TECH CO., LTD., Ohtsuki (JP)

(72) Inventors: Toshinaka Shinbutsu, Ohtsuki (JP); Teruie Takemasu, Mobara (JP); Shuichi Amano, Ohtsuki (JP)

(73) Assignee: FORM ROLL TECH CO., LTD., Ohtsuki (JP)

( * ) Notice: Subject to any disclaimer, the term of this patent is extended or adjusted under 35 U.S.C. 154(b) by 315 days.

(21) Appl. No.: 16/621,981

(22) PCT Filed: Mar. 27, 2019

(86) PCT No.: PCT/JP2019/013175
§ 371 (c)(1),
(2) Date: Dec. 12, 2019

(87) PCT Pub. No.: WO2019/230167
PCT Pub. Date: Dec. 5, 2019

(65) Prior Publication Data
US 2020/0132105 A1    Apr. 30, 2020

(30) Foreign Application Priority Data
Jun. 1, 2018  (JP) .............................. JP2018-106434

(51) Int. Cl.
*F16B 39/30*  (2006.01)
*F16B 35/00*  (2006.01)
(52) U.S. Cl.
CPC .............. *F16B 39/30* (2013.01); *F16B 35/00* (2013.01)

(58) Field of Classification Search
CPC .... F16B 5/0283; F16B 25/00; F16B 25/0068; F16B 33/02; F16B 35/00; F16B 35/0065; F16B 39/14; F16B 39/30; Y10S 411/929
(Continued)

(56) References Cited

U.S. PATENT DOCUMENTS

| 184,336 | A | * | 11/1876 | Camp | ..................... F16B 39/12 411/222 |
| 1,003,379 | A | * | 9/1911 | Smith | ..................... F16B 39/12 411/223 |

(Continued)

FOREIGN PATENT DOCUMENTS

| JP | 2006189056 A | 7/2006 |
| JP | 2018080819 A | 5/2018 |
| WO | 2016194842 A1 | 12/2016 |

*Primary Examiner* — Roberta S Delisle
(74) *Attorney, Agent, or Firm* — Alleman Hall Creasman & Tuttle LLP

(57) ABSTRACT

A dual-threaded screw structure having two kinds of threads formed on a shank, namely, a first thread consisting of one or more threads and a second thread having a lead larger than a lead of the first thread is provided herein. The claimed configuration has a beneficial effect of preventing looseness when the screw structure is fastened with double nuts. One embodiment of the present invention exhibits an example of a dual-threaded screw structure, in which a root diameter between the ridges of the hill-like second thread ridges is formed to be larger by 10% of a height of the ridges than an effective diameter of a first thread. In this case, an inner diameter of an internal thread of a second nut for preventing looseness is formed to be larger than the effective diameter of the first thread by 10% of the height of the ridges.

9 Claims, 17 Drawing Sheets

(58) Field of Classification Search
USPC .... 411/259, 337, 366.1, 383, 411, 412, 924, 411/929
See application file for complete search history.

(56) References Cited

U.S. PATENT DOCUMENTS

| | | | | |
|---|---|---|---|---|
| 1,018,855 | A * | 2/1912 | Van Omer | F16B 39/04 |
| | | | | 411/224 |
| 3,207,023 | A * | 9/1965 | Knohl | F16B 25/0031 |
| | | | | 411/387.3 |
| 3,426,820 | A * | 2/1969 | Phipard, Jr. | F16B 39/30 |
| | | | | 411/310 |
| 3,794,092 | A * | 2/1974 | Carlson | F16B 39/30 |
| | | | | 411/310 |
| 4,655,661 | A * | 4/1987 | Brandt | F16B 25/0031 |
| | | | | 411/387.1 |
| 5,188,496 | A * | 2/1993 | Giannuzzi | F16B 25/00 |
| | | | | 411/310 |
| 5,294,227 | A * | 3/1994 | Forster | F16B 25/0026 |
| | | | | 411/386 |
| 6,296,433 | B1 * | 10/2001 | Forsell | F16B 25/00 |
| | | | | 411/386 |
| 6,976,818 | B2 * | 12/2005 | Levey | F16B 33/02 |
| | | | | 411/310 |
| 7,114,902 | B2 * | 10/2006 | Reiter | F16B 13/002 |
| | | | | 411/412 |
| 8,430,619 | B2 * | 4/2013 | Olsen | F16B 25/00 |
| | | | | 411/412 |
| 8,608,252 | B2 * | 12/2013 | Ling | B60B 1/04 |
| | | | | 301/104 |
| 2003/0206787 | A1 * | 11/2003 | Huang | F16B 25/0047 |
| | | | | 411/412 |
| 2006/0140738 | A1 * | 6/2006 | Lin | F16B 25/0057 |
| | | | | 411/186 |
| 2014/0119852 | A1 * | 5/2014 | Lee | F16B 39/30 |
| | | | | 411/412 |

* cited by examiner

FIG. 3(a) POSITION OF 0°
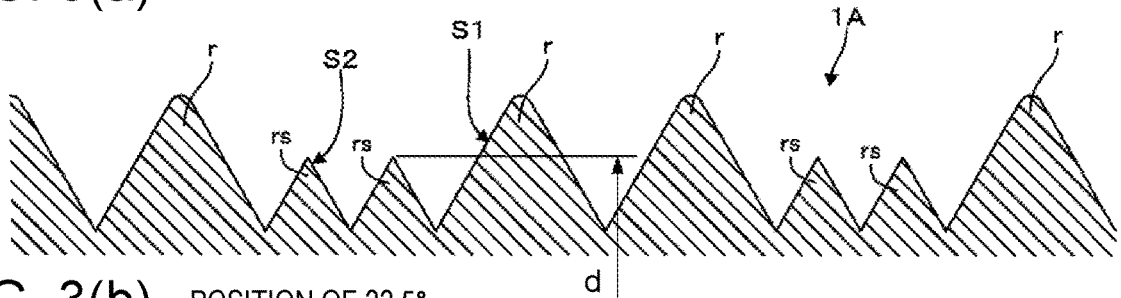
FIG. 3(b) POSITION OF 22.5°
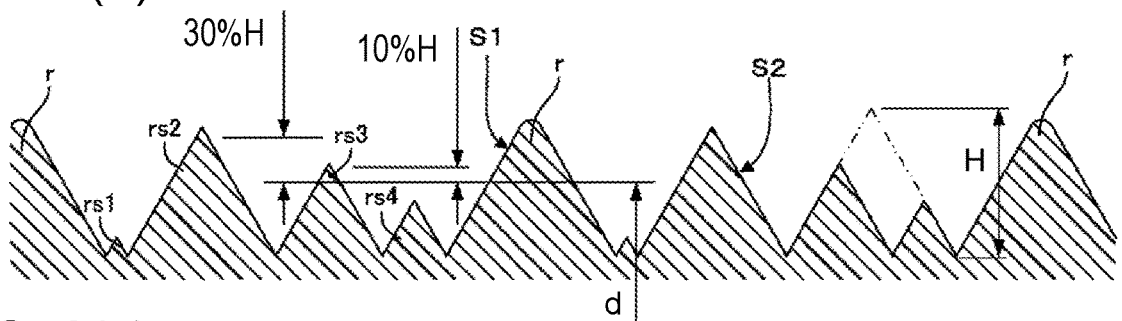
FIG. 3(c) POSITION OF 45°
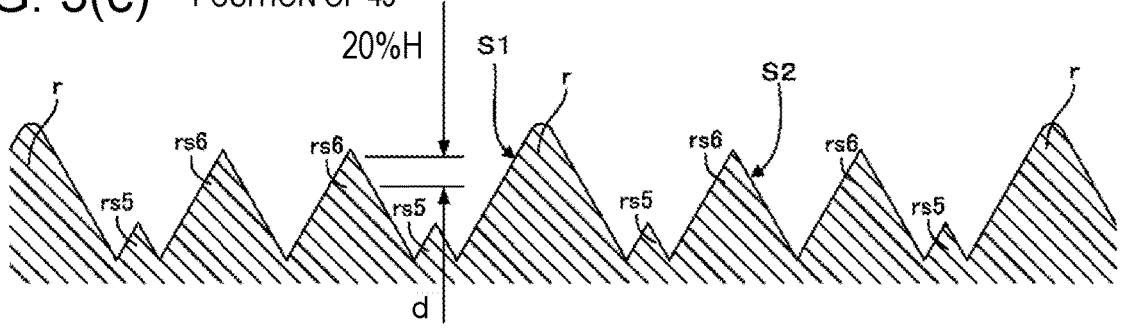
FIG. 3(d) POSITION OF 67.5°
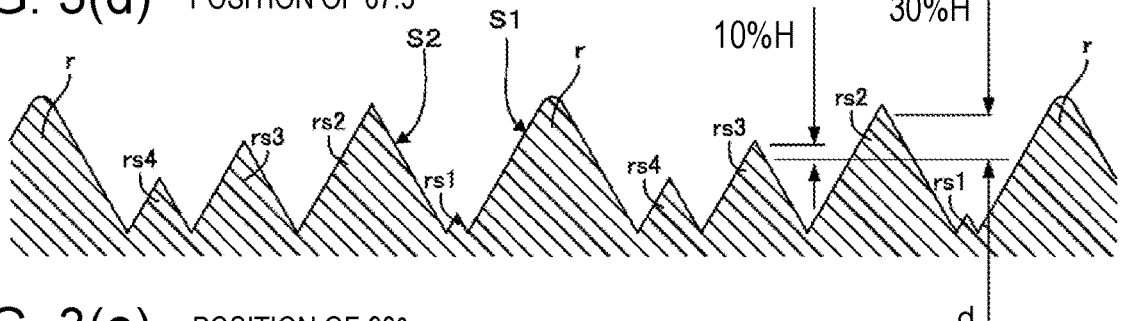
FIG. 3(e) POSITION OF 90°
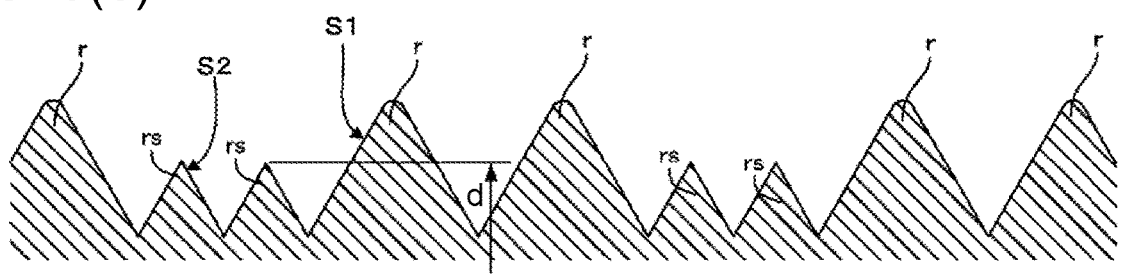

FIG. 4(a) POSITION OF 0°
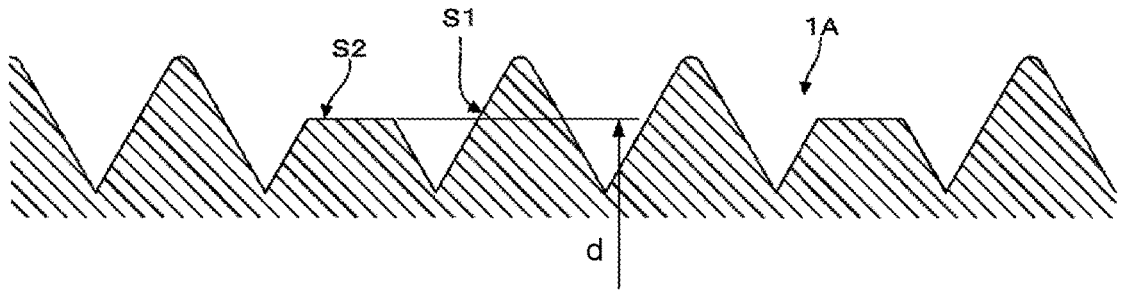
FIG. 4(b) POSITION OF 22.5°
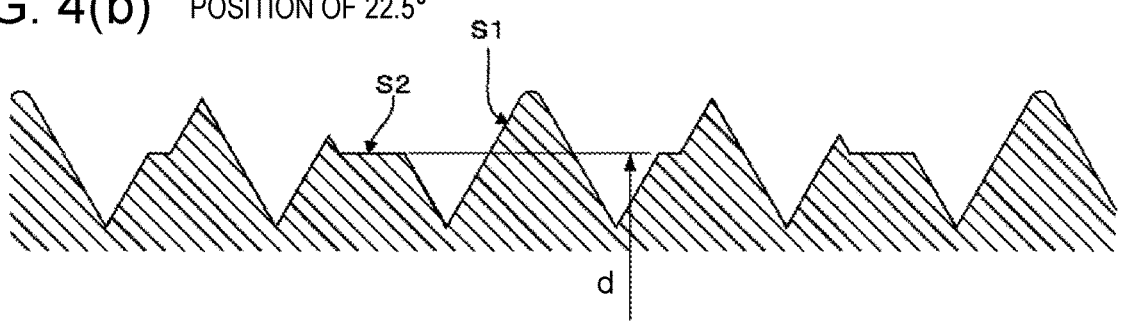
FIG. 4(c) POSITION OF 45°
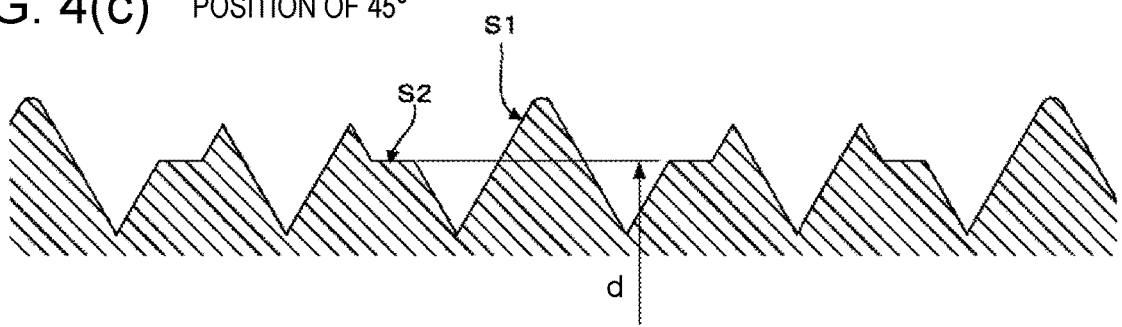
FIG. 4(d) POSITION OF 67.5°
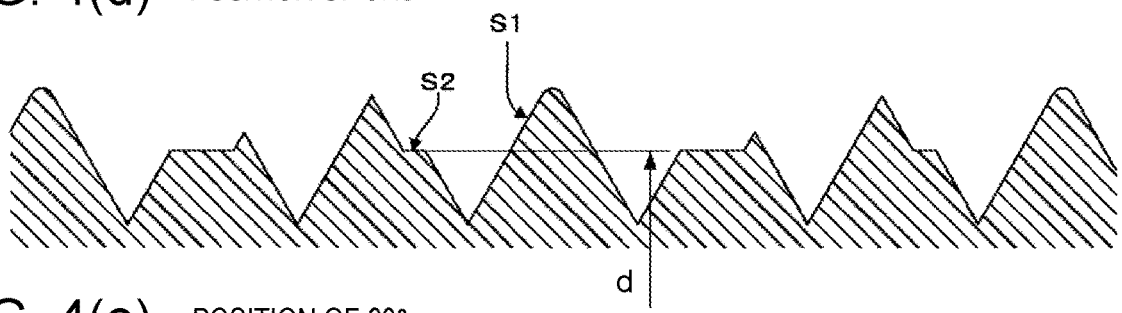
FIG. 4(e) POSITION OF 90°
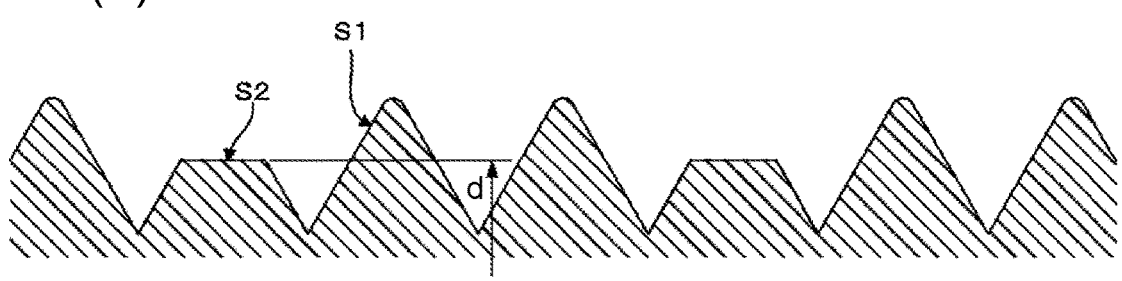

FIG. 5(a)  POSITION OF 0°
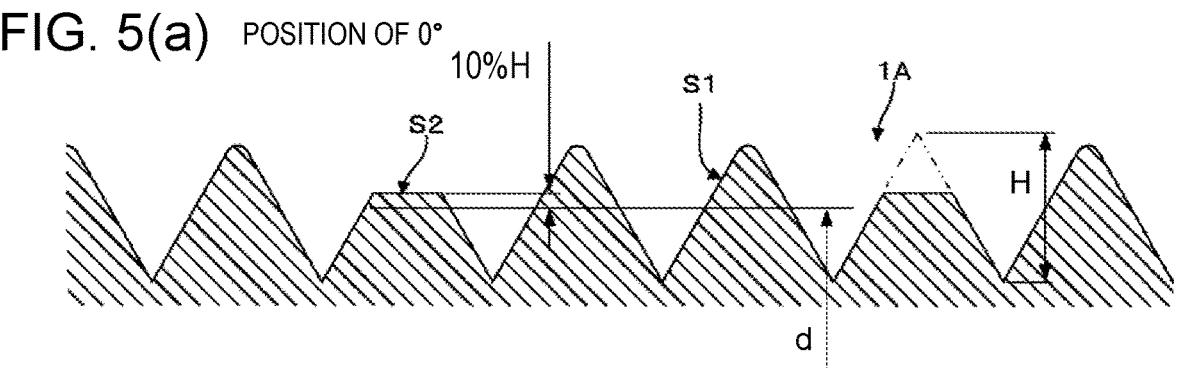
FIG. 5(b)  POSITION OF 22.5°
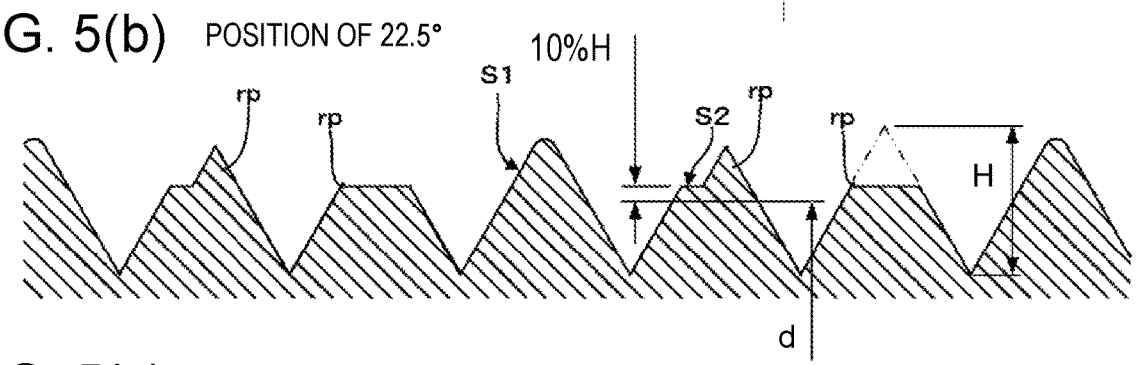
FIG. 5(c)  POSITION OF 45°
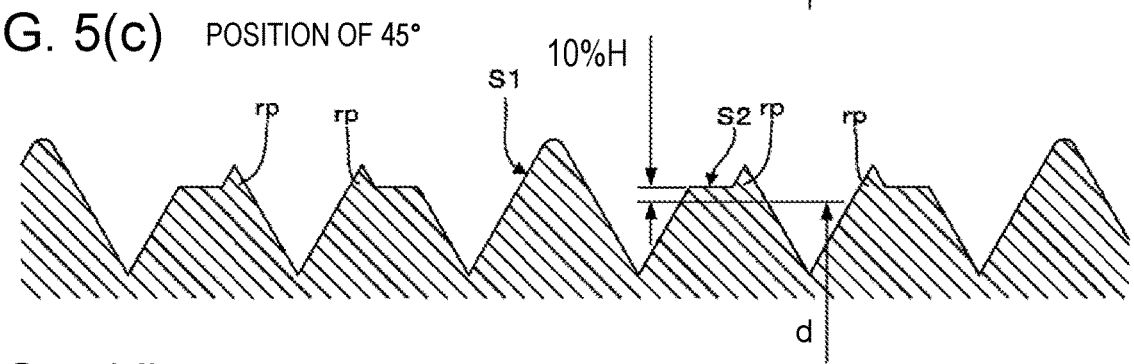
FIG. 5(d)  POSITION OF 67.5°
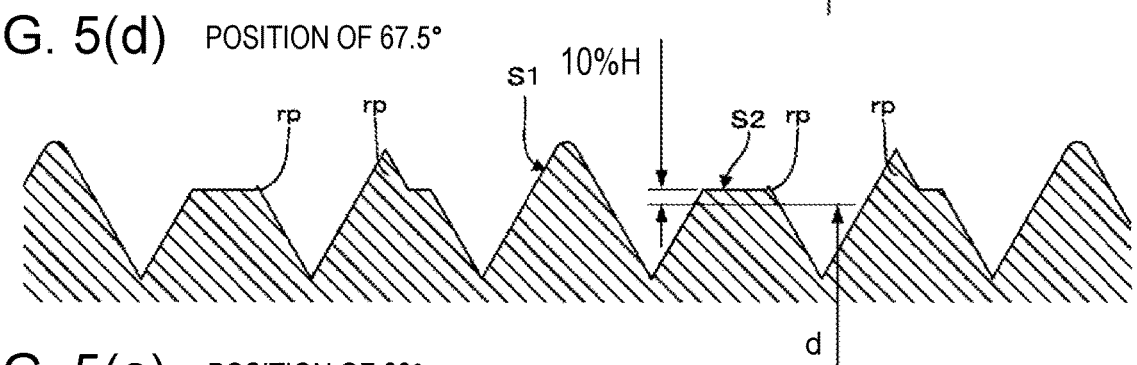
FIG. 5(e)  POSITION OF 90°
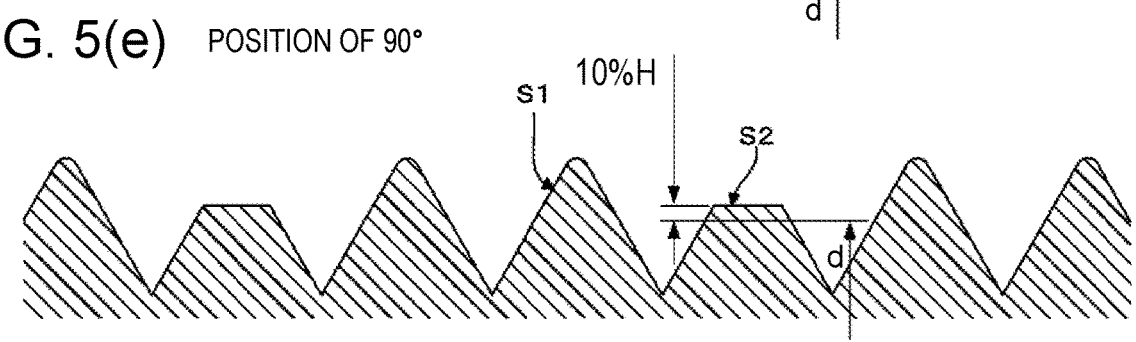

FIG. 6(a) POSITION OF 0°
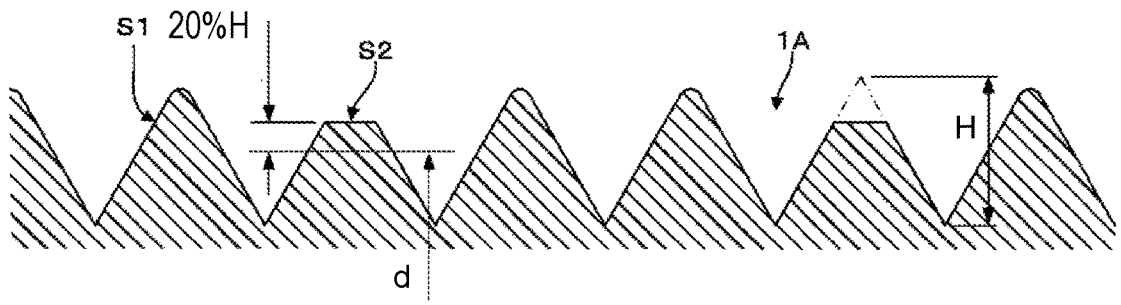
FIG. 6(b) POSITION OF 22.5°
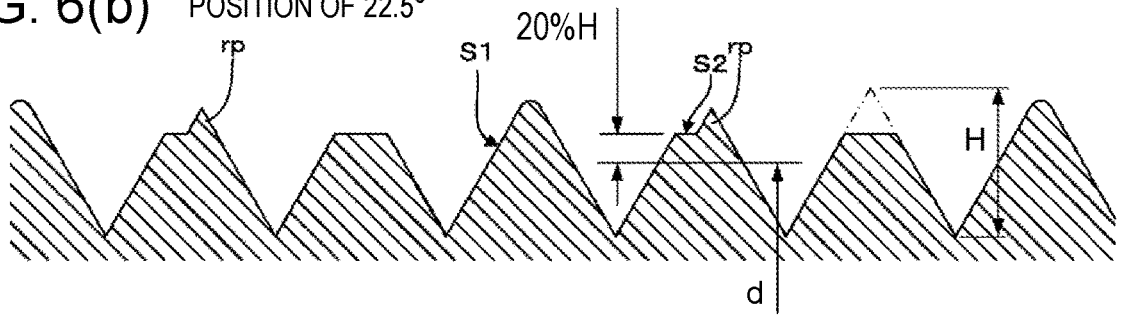
FIG. 6(c) POSITION OF 45°
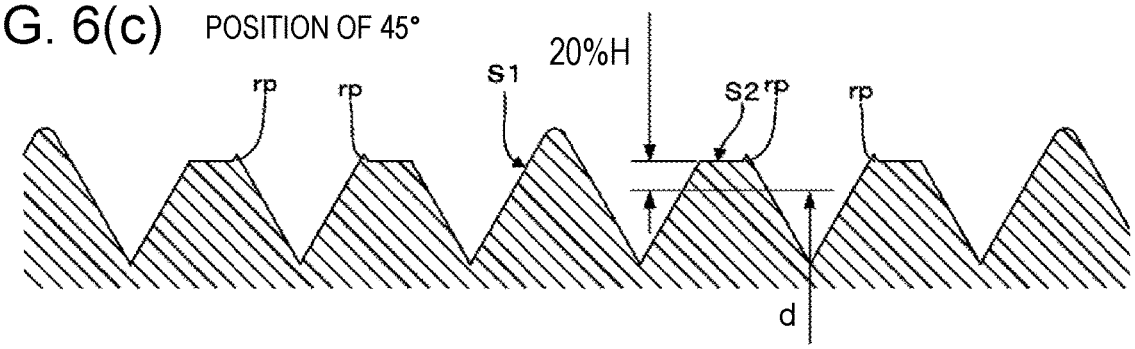
FIG. 6(d) POSITION OF 67.5°
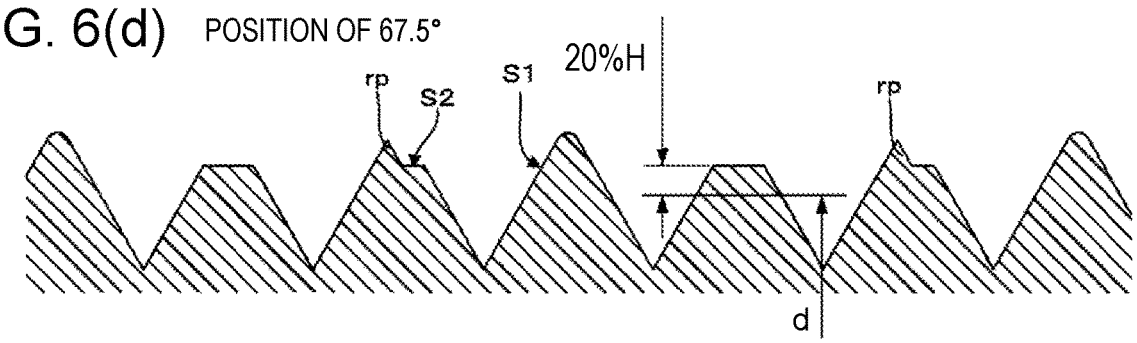
FIG. 6(e) POSITION OF 90°
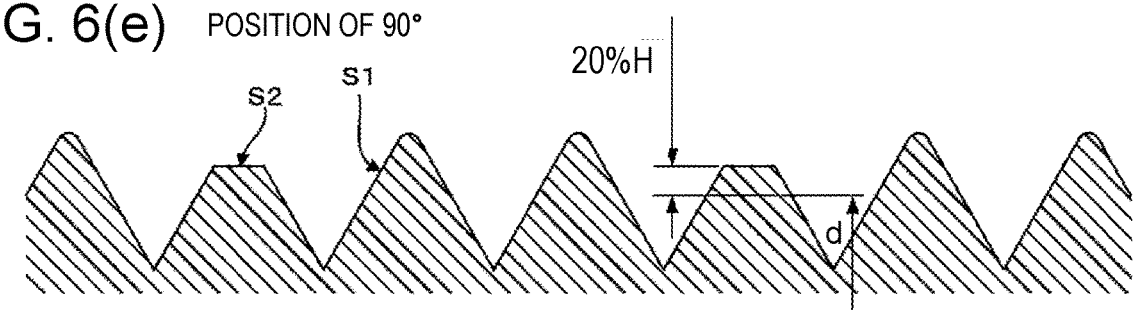

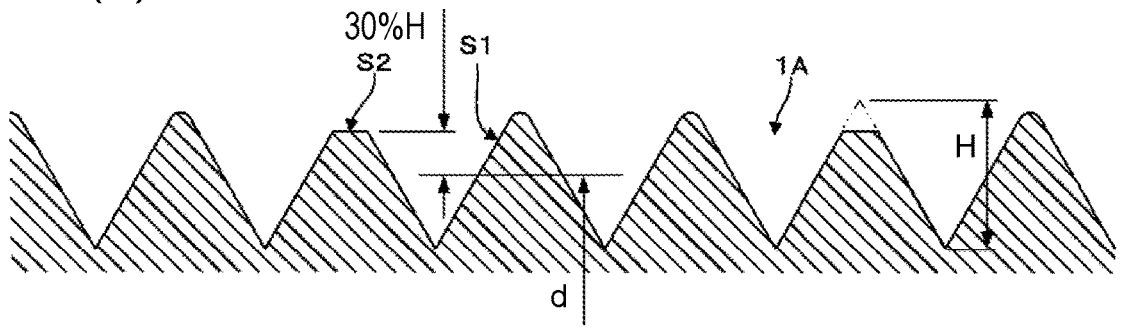
FIG. 7(a) POSITION OF 0°
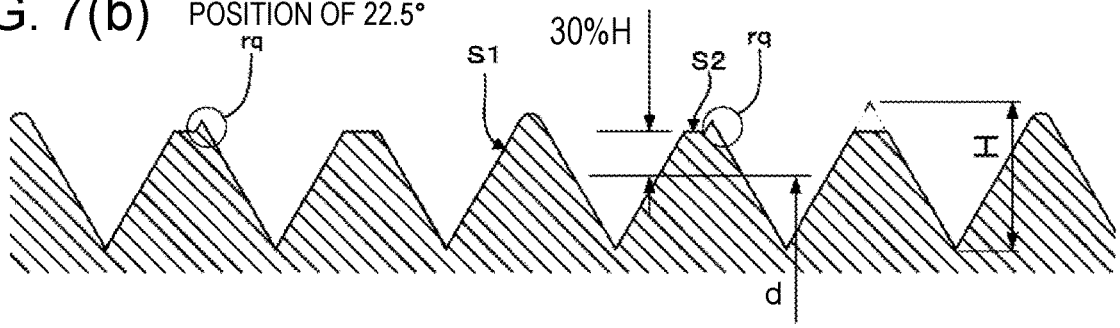
FIG. 7(b) POSITION OF 22.5°
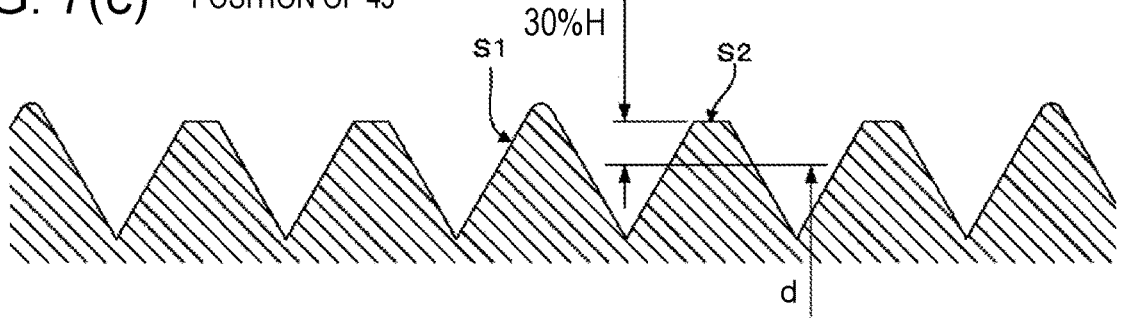
FIG. 7(c) POSITION OF 45°
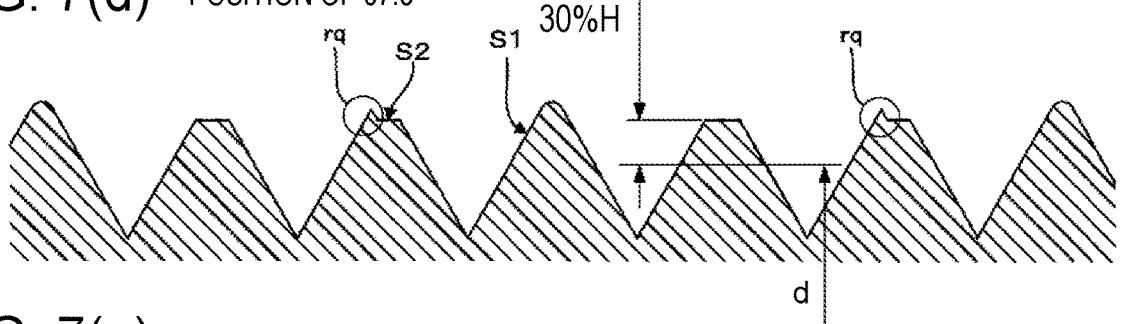
FIG. 7(d) POSITION OF 67.5°
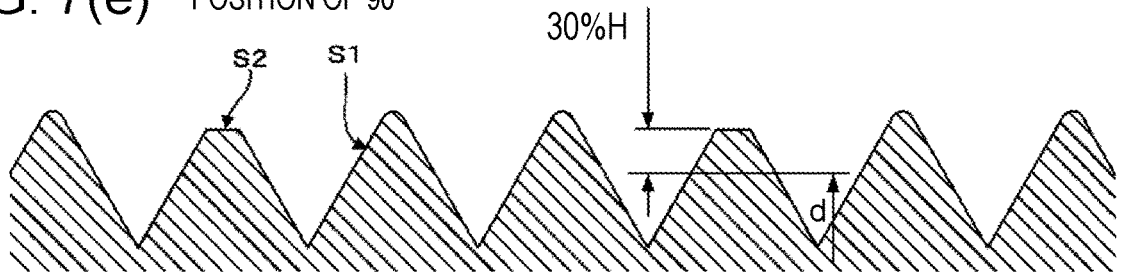
FIG. 7(e) POSITION OF 90°

FIG. 10

| | Data of test pieces having root diameter of second thread same as effective diameter of first thread ||||||||||
|---|---|---|---|---|---|---|---|---|---|
| | Test piece 1 ||| Test piece 2 ||| Test piece 3 |||
| Repetition times | Initial axial force (kN) | Residual axial force (kN) | Residual axial force (%) | Initial axial force (kN) | Residual axial force (kN) | Residual axial force (%) | Initial axial force (kN) | Residual axial force (kN) | Residual axial force (%) |
| 1 | 6.4 | 2.7 | 42 | 12.6 | 10.1 | 80 | 12.5 | 9.9 | 79 |
| 2 | 12.2 | 9.6 | 79 | 14.0 | 12.8 | 91 | 15.4 | 13.0 | 84 |
| 3 | 13.3 | 1.3 | 10 | 14.9 | 12.3 | 82 | 15.8 | 11.6 | 73 |
| 4 | 12.1 | 10.1 | 83 | 15.3 | 1.3 | 8 | 15.8 | 13.3 | 84 |
| 5 | 13.0 | 0.1 | 1 | 14.1 | 11.9 | 85 | 17.0 | 14.3 | 84 |
| 6 | 15.4 | 1.4 | 9 | 15.7 | 14.4 | 91 | 17.3 | 14.9 | 86 |
| 7 | 14.3 | 0.8 | 5 | 14.5 | 12.4 | 86 | 17.3 | 14.4 | 83 |
| 8 | 13.3 | 11.5 | 87 | 15.2 | 13.1 | 86 | 16.8 | 12.6 | 75 |
| 9 | 14.5 | 0.2 | 1 | 16.8 | 14.8 | 88 | 17.0 | 14.2 | 84 |
| 10 | 16.7 | 12.7 | 76 | 17.2 | 14.7 | 85 | 18.4 | 15.4 | 84 |

FIG. 11

Data of test pieces having root diameter of second thread larger by 10% than effective diameter of first thread

| Repetition times | Test piece 1 | | | Test piece 2 | | | Test piece 3 | | |
|---|---|---|---|---|---|---|---|---|---|
| | Initial axial force (kN) | Residual axial force (kN) | Residual axial force (%) | Initial axial force (kN) | Residual axial force (kN) | Residual axial force (%) | Initial axial force (kN) | Residual axial force (kN) | Residual axial force (%) |
| 1 | 10.7 | 7.5 | 70 | 11.4 | 10.2 | 89 | 12.5 | 8.6 | 69 |
| 2 | 16.4 | 13.8 | 84 | 16.0 | 13.1 | 82 | 15.5 | 12.7 | 82 |
| 3 | 17.2 | 14.6 | 85 | 15.3 | 12.1 | 79 | 16.6 | 14.3 | 86 |
| 4 | 18.0 | 14.9 | 83 | 16.6 | 14.1 | 85 | 17.0 | 14.5 | 85 |
| 5 | 17.2 | 15.1 | 88 | 16.6 | 14.4 | 87 | 17.3 | 14.2 | 82 |
| 6 | 16.0 | 12.7 | 79 | 17.3 | 15.1 | 87 | 17.3 | 14.4 | 83 |
| 7 | 15.4 | 12.8 | 83 | 15.7 | 12.1 | 77 | 18.1 | 15.4 | 85 |
| 8 | 18.1 | 15.4 | 85 | 16.2 | 13.1 | 81 | 19.4 | 17.2 | 89 |
| 9 | 14.8 | 11.9 | 80 | 17.5 | 14.5 | 83 | 18.2 | 15.9 | 87 |
| 10 | 16.1 | 13.7 | 85 | 17.3 | 14.2 | 82 | 19.8 | 17.2 | 87 |

FIG. 12

Data of test pieces having root diameter of second thread larger by 20% than effective diameter of first thread

| Repetition times | Test piece 1 | | | Test piece 2 | | | Test piece 3 | | |
|---|---|---|---|---|---|---|---|---|---|
| | Initial axial force (kN) | Residual axial force (kN) | Residual axial force (%) | Initial axial force (kN) | Residual axial force (kN) | Residual axial force (%) | Initial axial force (kN) | Residual axial force (kN) | Residual axial force (%) |
| 1 | 10.4 | 7.1 | 68 | 15.1 | 11.6 | 77 | 12.6 | 9.7 | 77 |
| 2 | 11.5 | 8.8 | 77 | 15.8 | 12.7 | 80 | 15.0 | 12.0 | 80 |
| 3 | 12.9 | 10.2 | 79 | 17.0 | 13.7 | 81 | 15.2 | 11.9 | 78 |
| 4 | 13.5 | 10.8 | 80 | 18.0 | 13.9 | 77 | 15.8 | 12.1 | 77 |
| 5 | 13.7 | 11.2 | 82 | 16.5 | 12.9 | 78 | 16.5 | 13.0 | 79 |
| 6 | 14.5 | 11.7 | 81 | 17.5 | 14.0 | 80 | 16.9 | 13.8 | 82 |
| 7 | 18.8 | 16.5 | 88 | 17.9 | 14.8 | 83 | 17.2 | 14.4 | 84 |
| 8 | 13.5 | 10.5 | 78 | 18.3 | 15.3 | 84 | 17.2 | 14.0 | 81 |
| 9 | 12.6 | 9.9 | 79 | 18.1 | 16.7 | 92 | 16.6 | 13.3 | 80 |
| 10 | 14.3 | 11.1 | 78 | 18.4 | 15.1 | 82 | 16.8 | 13.8 | 82 |

FIG. 13

| | Data of a test piece having root diameter of second thread larger by 30% than effective diameter of first thread | | |
|---|---|---|---|
| | Test piece 1 | | |
| Repetition times | Initial axial force (kN) | Residual axial force (kN) | Residual axial force (%) |
| 1 | 13.5 | 10.3 | 76 |
| 2 | 14.5 | 11.7 | 81 |
| 3 | 12.4 | 9.7 | 78 |
| 4 | 19.1 | 16.6 | 87 |
| 5 | 7.2 | 5.4 | 75 |
| 6 | — | — | — |
| 7 | — | — | — |
| 8 | — | — | — |
| 9 | — | — | — |
| 10 | — | — | — |

DUAL-THREADED SCREW STRUCTURE AND FASTENING STRUCTURE THEREWITH

FIELD OF THE INVENTION

The present invention relates to a dual-threaded screw structure having a function that prevents looseness in fastening with double nuts, and a fastening structure that includes the dual-threaded screw structure. More particularly, the present invention relates to a dual-threaded screw structure (of an external thread) that has two kinds of threads formed, one being a first thread and the other being a second thread formed on the thread ridge of the first thread so that the second thread has a lead larger than a lead of the first thread, and a fastening structure that includes the dual-threaded screw structure.

BACKGROUND OF THE INVENTION

A dual-threaded screw structure having two kinds of threads formed on a shank is conventionally known, for example, to have a first thread (S1) that is a metric coarse thread and a second thread (S2) formed on the first thread (S1) in a same spiral direction as the first thread (S1) to be laid thereon, in which the second thread (S2) has fewer threads, by one thread or more, than a multiple thread having a lead multiplied from a pitch of the first thread (S1) (see Patent Document 1: WO2016/194842). This dual-threaded screw is fastened with two nuts: a metric coarse nut screwed onto the first thread (S1) and a high lead nut (a nut having a multiple thread) screwed onto the second thread (S2) to be used as a fastening structure.

As this dual-threaded screw structure has two kinds of threads formed thereon, thread ridges lower than a standard triangular thread ridge of a metric coarse thread may appear periodically and continuously in a section including an axis line of the shank corresponding to angular position of the section. Due to this, when the dual-threaded screw structure is loaded with an axial force, thread ridges are broken or weakened by plastic deformation from shear force or contact surface pressure with the nut corresponding to an angular position. Thus, the configuration of a thread ridge is proposed in Patent Document 1 in which a root diameter of the second thread is a large diameter, the root diameter being recommended to be equal to or less than an effective diameter of the screw.

PRIOR ART DOCUMENTS

Patent Document

Patent Document 1: WO2016/194842

DISCLOSURE OF THE INVENTION

Problems to be Solved by the Invention

In a case where the dual-threaded screw structure has a metric coarse thread as in the above prior art, fastening is performed with so called double nuts, such that a high lead nut is screwed onto a second thread (S2) having a root diameter no more than an effective diameter of a first thread of the dual-threaded screw structure and then a metric coarse nut is screwed onto the first thread (S1) of the dual-threaded screw structure to fasten a body to be fastened. At this time, after fastening is performed with an axial force more than a preset value with the metric coarse nut alone, the high lead nut is unfastened. It was found as explained later that, when a severe looseness test was conducted with a "screw loosening vibration tester" proposed by the inventors without unfastening the high lead nut, variations in the residual axial force are seen and loosening occurred.

This seems to be caused by a situation in which, when the metric coarse nut is screwed onto the dual-threaded screw structure to fasten it with a strong fastening torque without unfastening the high lead nut, plastic deformation is generated and causes an axial force to be lowered under an applied shear load, etc. This is due to an axial force because a rigidity of low thread ridge portions is lower than a rigidity of a primary thread ridge of the first thread (S1), so that a locking force between the double nuts cannot be strong. Thus, a common fastening operation for avoiding this situation is one such that, after fastening is first performed with the metric coarse nut with a necessary torque, the high lead nut is unfastened. This operation of unfastening the high lead nut is an extra operation step as seen from a course of the fastening operation and necessitates managing torque for both nuts, thus causing management to be complex.

As explained above, it is preferable to allow a locking force between the double nuts to be strong only by fastening the metric coarse nut with a necessary torque without unfastening the high lead nut. That is, for a fastening structure with double nuts using a dual-threaded screw structure, if an axial force of the fastening structure is not lowered when the test is conducted with a looseness tester that reproduces a most severe loosening load that can be assumed, the operation of unfastening a high lead nut becomes unnecessary, so that the efficiency of the fastening operation is improved. The present invention is made considering the above background and attains the following objects.

It is an object of the present invention to provide a dual-threaded screw structure with two kinds of threads formed on a shank that has a structure enabling a high looseness preventing function to be acquired when fastening is made with a double nut, and a fastening structure including the dual-threaded screw structure.

It is another object of the present invention to provide a dual-threaded screw structure with two kinds of threads formed on a shank that is easily manufactured through roll forming, and a fastening structure including the dual-threaded screw structure.

It is still another object of the present invention to provide a dual-threaded screw structure with two kinds of threads formed on a shank that has a structure in which shear breaking or plastic deformation does not occur when fastening is made with double nuts, and a fastening structure including the dual-threaded screw structure.

Means for Solving the Problems

The present invention employs the following means for achieving the above objects. The dual-threaded screw structure according to a first aspect of the invention has two kinds of threads formed on a shank, the two kinds of threads comprising:

a first thread including one or more threads of a kind selected from a metric thread, a Whitworth thread, a unified thread, a trapezoidal thread, a pipe thread, a round thread, a ball thread, and an angular thread; and a second thread having a lead larger than the first thread,
wherein a root diameter of the second thread is larger than an effective diameter of the first thread and smaller than an outer diameter of the first thread.

The dual-threaded screw structure according to a second aspect of the invention is characterized in that, in the first aspect, the first thread is a one-threaded thread and the second thread is a one-threaded thread or a multiple-threaded thread.

The dual-threaded screw structure according to a third aspect of the invention is characterized in that, in the first or second aspect, the second thread is a same kind of thread as the first thread.

The dual-threaded screw structure according to a fourth aspect of the invention is characterized in that, in the first or second aspect, the root diameter of the second thread is larger in radius than the effective diameter of the first thread by less than 30% of a height of a ridge of the first thread.

The dual-threaded screw structure according to a fifth aspect of the invention is characterized in that, in the first or second aspect, the root diameter of the second thread is larger in radius than the effective diameter of the first thread by 10 to 20% of a height of a ridge of the first thread.

The fastening structure with a dual-threaded screw structure according to a sixth aspect of the invention comprises:
the dual-threaded screw structure having two kinds of threads formed on a shank, the two kinds of threads being a first thread including one or more threads of a kind selected from a metric thread, a Whitworth thread, a unified thread, a trapezoidal thread, a pipe thread, a round thread, a ball thread, and an angular thread, and a second thread having a lead larger than the first thread;
a first nut screwed onto the first thread; and
a second nut screwed onto the second thread,
wherein the dual-threaded screw structure has a strength such that stress imparted to ridges of the second thread of the dual-threaded screw structure from the second nut is in a range of allowable shearing stress and allowable contact surface pressure of the ridges of the second thread when an allowable maximum axial force is created between the dual-threaded screw structure and the second nut with a rotation torque externally imparted to the dual-threaded screw structure and the second nut.

The fastening structure with a dual-threaded screw structure according to a seventh aspect of the invention is characterized in that, in the sixth aspect, a root diameter of the second thread is larger than an effective diameter of the first thread and smaller than an outer diameter of the first thread, in a sectional shape including an axis line of the shank.

The fastening structure with a dual-threaded screw structure according to an eighth aspect of the invention is characterized in that, in the sixth or seventh aspect, the equation $$[(d_2/2) \cdot \tan(\alpha+p') + r_2 \cdot \tan\rho] > \tan\rho \cdot r_1$$

is satisfied when the first nut is rotated when μ is a friction coefficient, $\mu = \tan\rho$, $\rho'$ is a friction angle of a contact surface with which the second thread contacts the second nut, $r_2$ is an averaged radius of a seat with which the second nut contacts a member to be fastened, $d_2$ is an effective diameter of thread surface with which the second thread contacts the second nut, α is a lead angle of the second thread, and $r_1$ is an averaged radius of a seat with which the first nut contacts the second nut.

The fastening structure with a dual-threaded screw structure according to a ninth aspect of the invention is characterized in that, in the sixth or seventh aspect, one or more of an irregularity, a flange, and a rough surface is formed on a surface of the second nut contacting the member to be fastened.

Advantageous Effect of the Invention

When fastening a dual-threaded screw structure or a fastening structure that includes a dual-threaded screw structure is performed with double nuts, a desired axial force is applied to a bolt only by screwing a nut of a low lead with a preset torque to fasten and, as a result, a locking force can be secured between this nut and a high lead nut as the other nut, that is, between the double nuts, so that loosening does not occur easily and the operation of unfastening the high lead nut becomes unnecessary. Further, the dual-threaded screw structure according to the present invention has a shallow groove of a second thread (a root diameter is large). Due to this, when the dual-threaded screw structure is worked through roll forming, an unnatural deformation is not generated and failure or wearing of a rolling die becomes less. Yet, the surface after roll forming has excellent quality.

BRIEF EXPLANATION OF DRAWINGS

FIGS. 3(a) to 3(e) are sectional views, each of which shows, in each angular position, a sectional configuration of the thread ridge of the dual-threaded portion shown in FIG. 2.

FIGS. 4(a) to 4(e) are sectional views, each of which shows, in each angular position, a sectional configuration of the thread ridge of a conventional dual-threaded portion, in which a root diameter of a second thread is formed to be equal to an effective diameter of a first thread.

FIGS. 5(a) to 5(e) are sectional views, each of which shows, in each angular position, a sectional configuration of the thread ridge of a dual-threaded portion by an embodiment of the present invention, in which a root diameter of a second thread is formed to be larger than an effective diameter of a first thread by 10%.

FIGS. 6(a) to 6(e) are sectional views, each of which shows, in each angular position, a sectional configuration of the thread ridge of a dual-threaded portion by an embodiment of the present invention, in which a root diameter of a second thread is formed to be larger than an effective diameter of a first thread by 20%.

FIGS. 7(a) to 7(e) are sectional views, each of which shows, in each angular position, a sectional configuration of the thread ridge of a dual-threaded portion by an embodiment of the present invention, in which a root diameter of a second thread is formed to be larger than an effective diameter of a first thread by 30%.

FIGS. 8(a) and 8(b) are views showing an example of a conventional dual-threaded screw structure (raised to an effective diameter) applied to a fastening structure having a looseness preventing nut, in which FIG. 8(a) is a partial sectional view and FIG. 8(b) is a sectional view showing engagement of nuts with the dual-threaded screw structure.

FIG. 10 shows data of looseness test conducted for a fastening structure, to which a conventional dual-threaded screw structure is applied, being specifically data of three test pieces in which a root diameter of a second thread is same as an effective diameter of a first thread.

FIG. 11 shows data of looseness test performed for a fastening structure having a looseness preventing nut as an embodiment of the dual-threaded structure according to the present invention, being specifically data of three test pieces in which a root diameter of a second thread is larger by 10% than an effective diameter of a first thread.

FIG. 12 shows data of looseness test of a fastening structure having a looseness preventing nut as an embodiment of the dual-threaded structure according to the present invention, being specifically data of three test pieces in which a root diameter of a second thread is larger by 20% than an effective diameter of a first thread.

FIG. 13 shows data of looseness test of a fastening structure having a looseness preventing nut as an embodiment of the dual-threaded structure according to the present invention, being specifically data of three test pieces in which a root diameter of a second thread is larger by 30% than an effective diameter of a first thread.

[Basic Composition of Dual-Threaded Screw Structure 1A]

Figure 1A:
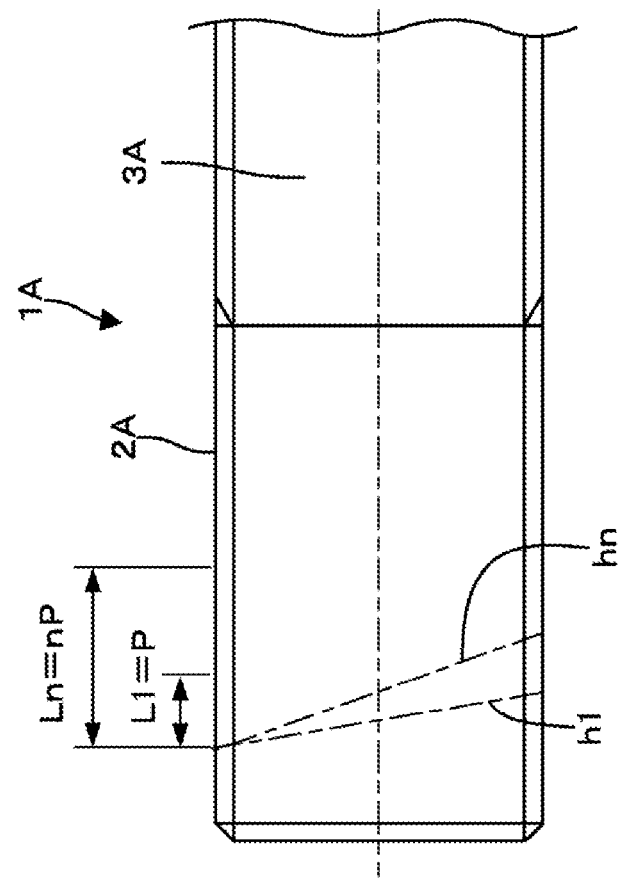
FIGS. 1(a) and 1(b) are side and front views, respectively, showing a dual-threaded screw structure according to the present invention.
Figure 1B:
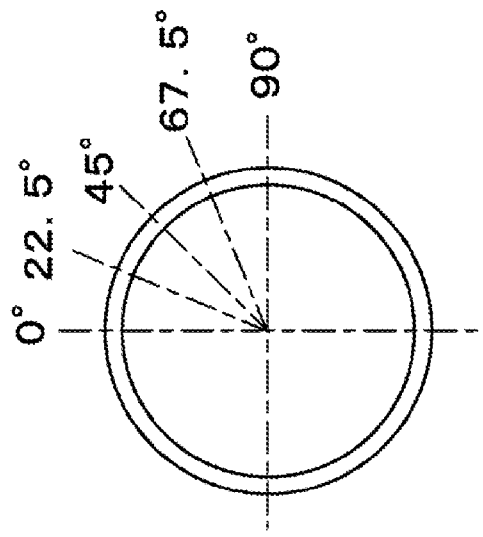

At first, problems of a conventional dual-threaded screw structure 1A will be explained for an example of metric coarse thread. FIGS. 1(a) and 1(b) show a dual-threaded screw structure, in which FIG. 1(a) is a side view and FIG. 1(b) is a front view. The dual-threaded screw structure 1A has thread ridges with triangular sectional shapes around the external periphery of a shank 3A in a section including the center axis line of the shank 3A. In this example, a first thread (S1) that is a metric coarse thread (also referred to as "a coarse thread" below) with a standard normalized pitch P (a lead $L_1$) corresponding to nominal diameter is formed. Further, a second thread (S2) with a lead $L_n$ (n*P) that is a predetermined multiple n-times of the pitch (P) of this coarse thread is formed on the thread ridge of the first thread. This second thread (S2) is a thread (a thread ridge and a groove) with a triangular sectional shape formed continuously and spirally on the thread ridge of the first thread (S1). Also, the second thread (S2) is a one-threaded thread or multi-threaded thread with a lead (nP) n-times of the pitch (P) of the thread, the direction of the spiral line of the second thread (S2) being the same twisting direction as the first thread (S1). Precisely, the second thread (S2) is one in which the thread number is less than the thread number of a primary multi-threaded thread by one thread or more, and has a lead that is the same as the lead of the primary multi-threaded thread in this example.

That is, the strength of thread ridge of a first thread is secured by removing one or more threads from the primary multi-threaded thread. In this situation, while the thread is one in which one or more threads are removed from the thread number of the primary multi-threaded thread, there is a case in which the thread is not multi-threaded, but a one-threaded thread as a result, depending on the number of the removed threads. Further, a lead $L_1$ of the first thread (S1) is smaller than a lead $L_n$ of the second thread (S2). The configuration and pitch P of the first thread (S1) are defined in the standard concerning screws (e.g., the International Organization for Standardization: ISO). In this embodiment, basic elements such as the metric coarse thread, etc., are standard. However, the pitch P of the first thread (S1) may be different from the standard. Moreover, while the dual-threaded screw structure 1A is shown only for the dual-threaded portion 2A and the vicinity thereof in FIG. 1(b), this dual-threaded screw structure 1A is formed as a shank, or a bolt (e.g., a hexagon head bolt, a hexagon socket head bolt, an eye bolt, a stud bolt, an anchor bolt, a set screw, a wing bolt, a U-bolt or a ceiling anchor bolt), etc.

Here, while the second thread (S2) of this embodiment is preferable to have a lead higher than a predetermined multiple of the lead of the first thread (S1), a thread with a lead of no more than four times of a lead of the first thread is better, considering that a metal material practical and common for use with a double-nut is used. The reason for this is that a nut screwed onto the second thread (S2) needs at least more than one cycle when the lead is high, thereby causing an axial length (height) of the nut to be long, and working becomes difficult when the nut is fabricated with a tap, etc. Due to this, a lead of no more than of four times is preferable for the second thread (S2). As explained above, while the first thread (S1) is a metric coarse thread in the embodiment of the present invention, the first thread (S1) may be of a kind selected from a metric thread, a Whitworth thread, a unified thread, a trapezoidal screw thread, a pipe thread, a circular thread, a ball thread, and an angular thread, in a case of use for a fastening structure.

[Composition of Thread Ridge in Conventional Dual-Threaded Screw Structure and Problems Thereof]

[Dual-Threaded Screw Structure Consisting of Metric Coarse Thread and "Two-Threaded Thread Having a Three-Times Lead"]

Figure 2:
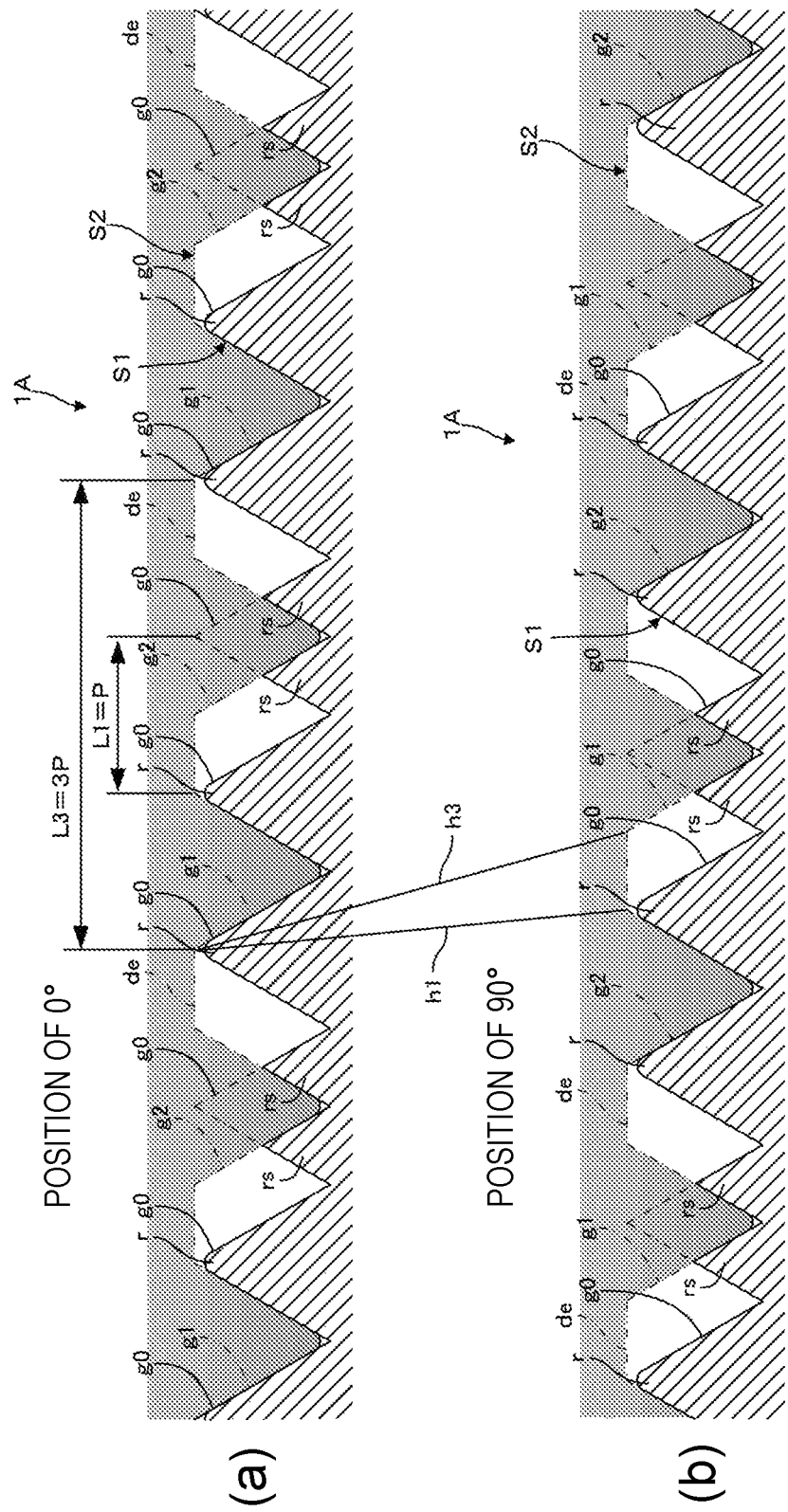
FIG. 2 is a composite explanatory sectional view, taken in a plane including the axis of a shank, of a dual-threaded portion of a dual-threaded screw structure 1A according to the present invention for explaining basic principle thereof, in which part (a) shows partially a sectional configuration of the dual-threaded portion in an "angular position of 0°" and part (b) shows partially a sectional configuration of the dual-threaded portion in an "angular position of 90°."

FIG. 2 is an enlarged view showing a thread ridge in the dual-threaded screw structure 1A shown in FIG. 1(b) as combined sectional views taken in a plane including the axis line of a shank 3A for explaining a basic composition of the dual-threaded screw structure 1A ("two-threaded thread having a three-times lead"), in which FIG. 2(a) part (a) shows a sectional configuration of the dual-threaded portion 2A in an "angular position of 0°" and part(b) shows a sectional configuration of the dual-threaded portion 2A in an "angular position of 90°." Two kinds of threads, that is, a first thread (S1) that is a metric coarse thread and a second thread (S2) that is similarly a metric coarse thread as a standard thread ridge are formed in the dual-threaded screw structure 1A.

In the dual-threaded screw structure 1A, a first thread (S1) (primary configuration thereof is shown with a one-dot chain line and a solid line) consisting of a thread and a groove is formed on the dual-threaded portion 2A (a solid line) of the shank 3A. This thread ridge is a standard "metric coarse thread" defined in ISO (the International Organization for Standardization) and a first thread (S1) having a thread with a triangular sectional shape is formed. A nut having a common internal metric thread for a metric coarse thread is screwed onto the first thread (S1). Further, a second thread (S2) is formed on the thread ridge of the first thread (S1) as if parts of it were cut out (removed). This second thread (S2) in this embodiment is a special thread in which one thread is removed from the three-threaded thread and the remaining two threads are arranged to be in an even angular phase (referred to as a "two-threaded thread having three-times lead" below).

The metric coarse thread as the first thread (S1) is a one-threaded thread in which the pitch P is the same as the lead $L_1$, and a groove $g_0$ and thread ridge r (a hatched portion) are formed along a spiral line hi at a constant pitch. The "two-threaded thread having a three-times lead" as the second thread (S2) (the grayed portion in FIG. 2 shows a nut screwed onto the thread portion) is a thread having a lead $L_3$ (3P), in which two-threaded grooves $g_1$ and $g_2$ are formed along a spiral line $h_3$. As the second thread (S2) cut outs (removes) parts of ridges of the first thread (S1), the two-threaded grooves $g_1$ and $g_2$ are formed between the lead $L_3$ at equal intervals. This "two-threaded thread having a three-times lead" as the second thread is arranged to provide equal angular intervals.

In FIGS. 2(a) and 2(b), the first thread (S1) is a thread in which a sectional shape of a first thread ridge r having a pitch P (a lead $L_1$) shown with a contour line S1 (solid line and one-dot chain line) is triangular. The second thread (S2) of the "two-threaded thread having a three-times lead" is shown with a contour line S2 (solid line and two-dot chain line). As explained above, grayed portions shown in FIGS. 2(a) and 2(b) show a sectional shape of a second nut screwed onto the second thread (S2). With the "two-threaded thread having a three-times lead", a part de is formed where a thread ridge is not formed on the thread ridge of a coarse thread between the thread grooves $g_1$ and $g_2$ and between the thread grooves $g_2$ and $g_1$, as shown with a contour line S2 (a line parallel with the axis line appearing when the shank is cut with a plane including the axis line of the shank). That is, a vacant portion is formed at the part de as if it were cut out with the second thread (S2).

In the "angular position of 0°" in FIG. 2(a) and "angular position of 90°" in FIG. 2(b), a low hill-like thread ridge $r_s$ of the second thread (S2) (also being a low hill formed by cutting out a first thread ridge r; referred to as "a second thread ridge $r_s$" below) with a height of the thread ridge less than the height of the thread ridge r of the first thread (S1) appears as if the peak of the thread ridge of the first thread (S1) as a basic thread ridge of a primary coarse thread were partially cut out. In this angular position, the second thread ridge $r_s$ is formed with a thread configuration having a contour line in which two ridges form a mountain range. That is, when viewed from the first thread (S1), the thread ridge r of a parallel first thread (S1) having a basic thread ridge shape (triangular) of a coarse thread is cut out by forming the second thread (S2), so that height of the thread ridge r of the first thread becomes lower. The allowable shearing stress or allowable contact surface pressure of the thread ridge $r_s$ in this part becomes lower than that of the basic thread ridge (primary triangular thread ridge) of the first thread (S1). Further, there exist parts where the thread ridge is not formed on the first thread (S1) in any angular position at all with the dual-threaded screw structure 1A shown in FIG. 2 (for example, in an angular position of 0°, an angular position of 180°, etc.), so that parts where the primary triangular shape of the basic thread ridge of a coarse thread ridge is not formed appear.

FIGS. 3(a) to 3(e) show sectional views of sectional configurations of the thread ridge for particular angular positions in the dual-threaded portion 2A on the shank 3A shown in FIG. 2. That is, FIGS. 3(a) to 3(e) are sectional views showing sectional configuration in angular positions for every 22.5° around the axis line of the dual-threaded portion 2A shown in FIG. 1(a). With this dual-threaded screw structure 1A, the sectional configuration of same combination appears repeatedly at a predetermined period as shown in FIGS. 3(a) to 3(e). For example, with the "two-threaded thread having a three-times lead" shown in FIG. 2, a same configuration appears repeatedly with two leads combined for each period of three pitches of the coarse thread. As shown in FIGS. 3(a) and 3(e) for angular positions of 0° and 90° respectively, the two hill-like second thread ridges $r_s$ are lower than the basic thread ridge r of the first thread (S1) and are formed so as to have an outer diameter that is the same as an effective diameter d of the first thread (S1). Further, as shown in FIGS. 3(b), 3(c) and 3(d), the hill-like second thread ridges $r_s i$-$r_{s6}$ with various heights lower than the basic thread ridge r of the first thread (S1) are formed respectively. With a conventional dual-threaded screw structure shown in FIGS. 4(a) to 4(e), grooves between the second thread ridges $r_{s1}$-$r_{s6}$ of the dual-threaded screw structure shown in FIGS. 3(a) to 3(e) are filled so as to have same diameter as the effective diameter d of the first thread.

Figure 8A:
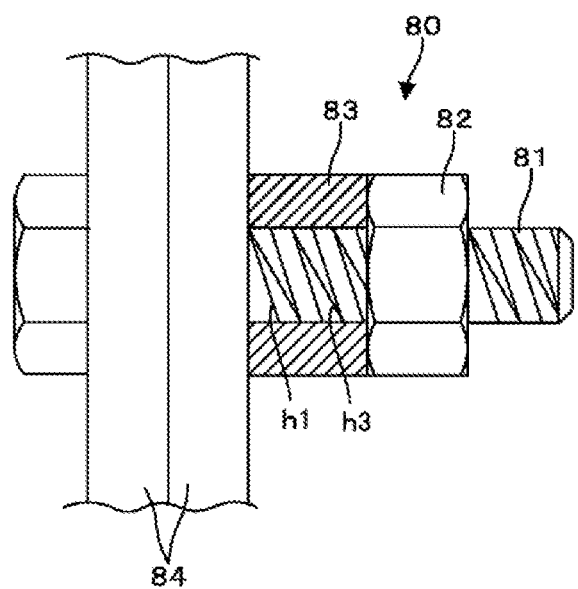

With this conventional dual-threaded screw structure 1A, in a case where double nuts for preventing looseness are used by a reverse method in a fastening structure 80 as shown in FIG. 8(a), a second nut 83 (a nut for preventing looseness) of an internal thread is screwed onto the second thread (S2) lightly at first (see FIGS. 8(a) and (b)). Next, a first nut 82 of an internal thread (a nut for fastening) is screwed onto the first thread (S1) (metric coarse thread) with management of fastening performed by a torque controlling method, etc. At this time, the second nut 83 is rotated further with rotation of the first nut 82 to fasten the members to be fastened 84 with a preset torque. After this fastening, it is usually necessary to impart a return locking force by rotating the second nut 83 in reverse in order to lock both nuts securely.

That is, the axial force using a dual-threaded screw structure 81 fastened with double nuts as shown in FIG. 8(a) is generated by screwing the first nut 82 onto the first thread (S1). Along with this, the second nut 83 for preventing looseness is unscrewed to generate the locking force between the second nut 83 and the first nut 82, thus providing the effect of preventing looseness. The lead angles of the two nuts are different from each other, which brings an effect of preventing looseness. With this fastening structure 80 provided with a nut for preventing looseness, a high axial force can be imparted to the hexagon head bolt 81 by fastening the members to be fastened 84 with the first nut 82 for the first thread (S1) screwed onto the first thread (S1) of the dual-threaded portion 2A. As a result, the fastened state can be maintained even when an external force is applied to the members to be fastened 84 in the axial direction.

However, with a conventional dual-threaded screw structure 1A as shown in FIG. 2 or FIGS. 3(a) to 3(e), the hill-like second thread ridges $r_{s1}$-$r_{s6}$ with various heights lower than the basic thread ridge r of the first thread (S1) are formed respectively. Consequently, when fastening is performed by rotating the first nut 82 with a fastening torque higher than a level exceeding an allowable tensile stress of the bolt 81, shearing stress and contact surface pressure are applied to the thread ridge of the hexagon head bolt 81 in an axial direction with a reaction force from the members to be fastened 84. If the shearing stress and contact surface pressure exceed the allowable shear fracture stress and allowable contact surface pressure of the hill-like second thread ridges $r_{s1}$-$r_{s6}$ respectively, there is a risk that shear fracture or plastic deformation will occur first in weak parts. Thus, in the Patent Document 1 explained above, a root diameter between the thread ridges of the hill-like second thread ridges $r_s$, $r_{s1}$-$r_{s6}$ is made to be the same as or less than an effective diameter d of the first thread (S1) (a structure in which grooves between the hill-like thread ridges are filled) as shown in FIGS. 4(*a*) to 4(*e*), so as to prevent shear fracture or plastic deformation of the hill-like second thread ridges $r_s$, $r_{s1}$-$r_{s6}$. Further, in the Patent Document 1 explained above, an inner diameter (D) of the internal thread of the second nut 83 as a nut for preventing looseness is made to be same as an effective diameter d of the first thread (S1) as shown in FIG. 8(*b*). FIG. 8(*b*) shows the configuration in an angular position of 45° as shown in FIG. 4(*c*).

[Looseness Test of Nuts with a Looseness Vibration Tester]

After a root diameter between the thread ridges of the hill-like second thread ridges $r_s$, $r_{s1}$-$r_{s6}$ has been made to be the same as or less than an effective diameter d of the first thread (S1) and fastening has been performed using a double-nut method, testing of this fastened structure was conducted with a looseness vibration tester. With the test, it was found that the dual-thread screw structure is not most effective configuration. FIGS. 14 to 17 show an external view of a looseness vibration tester and a detailed portion thereof respectively. The looseness test of a fastened structure was conducted in which a conventional dual-threaded screw structure was fastened using the double nut method. FIG. 10 is data showing a result of the test of the fastened structure of the dual-threaded screw structure, in which the root diameter of the second thread is the same as an effective diameter of the first thread.

This vibration test was conducted in a manner such that the looseness test was repeated ten times for each of three test pieces 1 to 3 (not shown) respectively. Each of the test pieces 1 to 3 is a dual-threaded screw structure with a nominal diameter of 12 mm made of a material SCM. A first nut made of SCM with a length of 10 mm and a second nut made of SCM with a length of 10 mm were used. As a test method, after fastening was performed first with a fastening torque of 42 Nm by a first nut, with a vibration frequency of 35 Hz and a test time of 29 seconds, the initial axial force after fastening and the residual axial force after one test were measured. The looseness test was conducted repeatedly 10 times in a similar manner. The "initial axial force (kN)" in FIG. 10 is an axial force generated in a bolt when fastening has been performed with a fastening torque of 42 Nm by a nut of coarse thread as a first nut. The "residual axial force (kN)" is an axial force remaining in a bolt after the looseness test. The "residual axial force (%)" is a ratio of a residual axial force after the test. As shown in FIG. 10, it was found that the initial axial force is low at 18.4 kN (test piece 3) at a maximum, the initial axial force varies to a large extent from 6.4 kN to 18.4 kN, and a minimum residual axial force is decreased to 1%, and thus looseness is generated.

[Explanation of a Looseness Vibration Tester]

Figure 14:
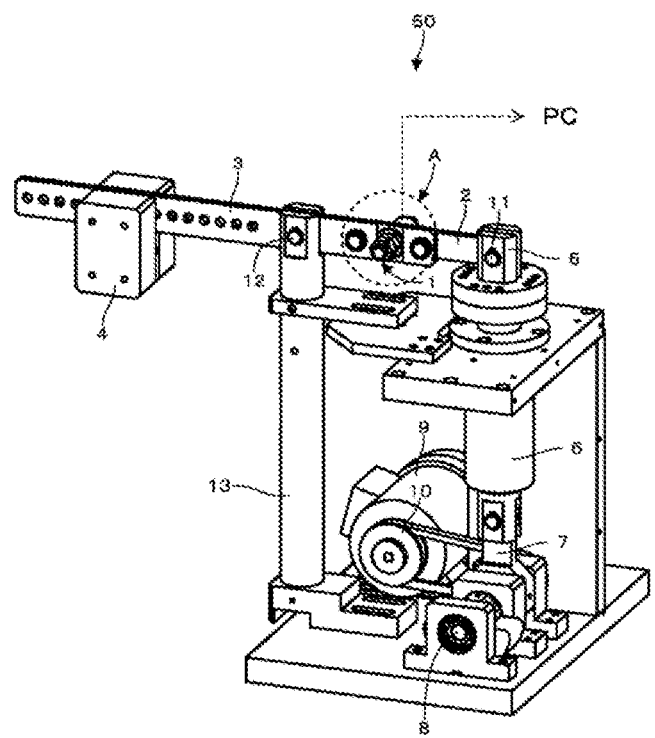
FIG. 14 is a three-dimensional external view showing a looseness vibration tester with which looseness test has been conducted.
Figure 15:
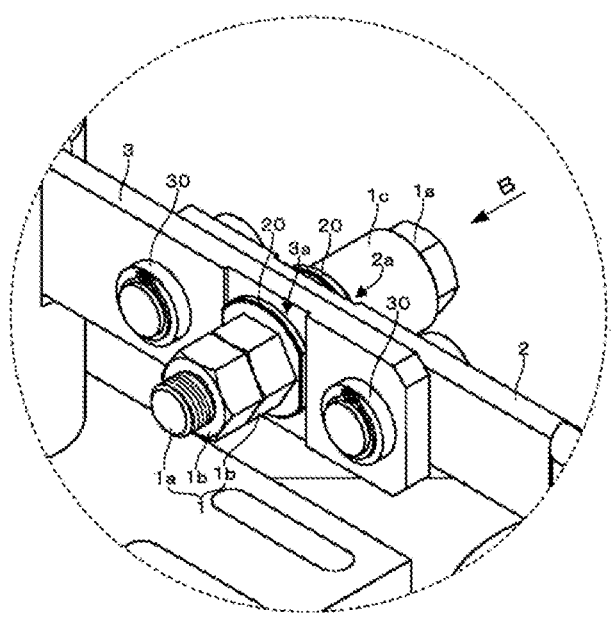
FIG. 15 is a partial enlarged view of a part A in FIG. 14.
Figure 16:
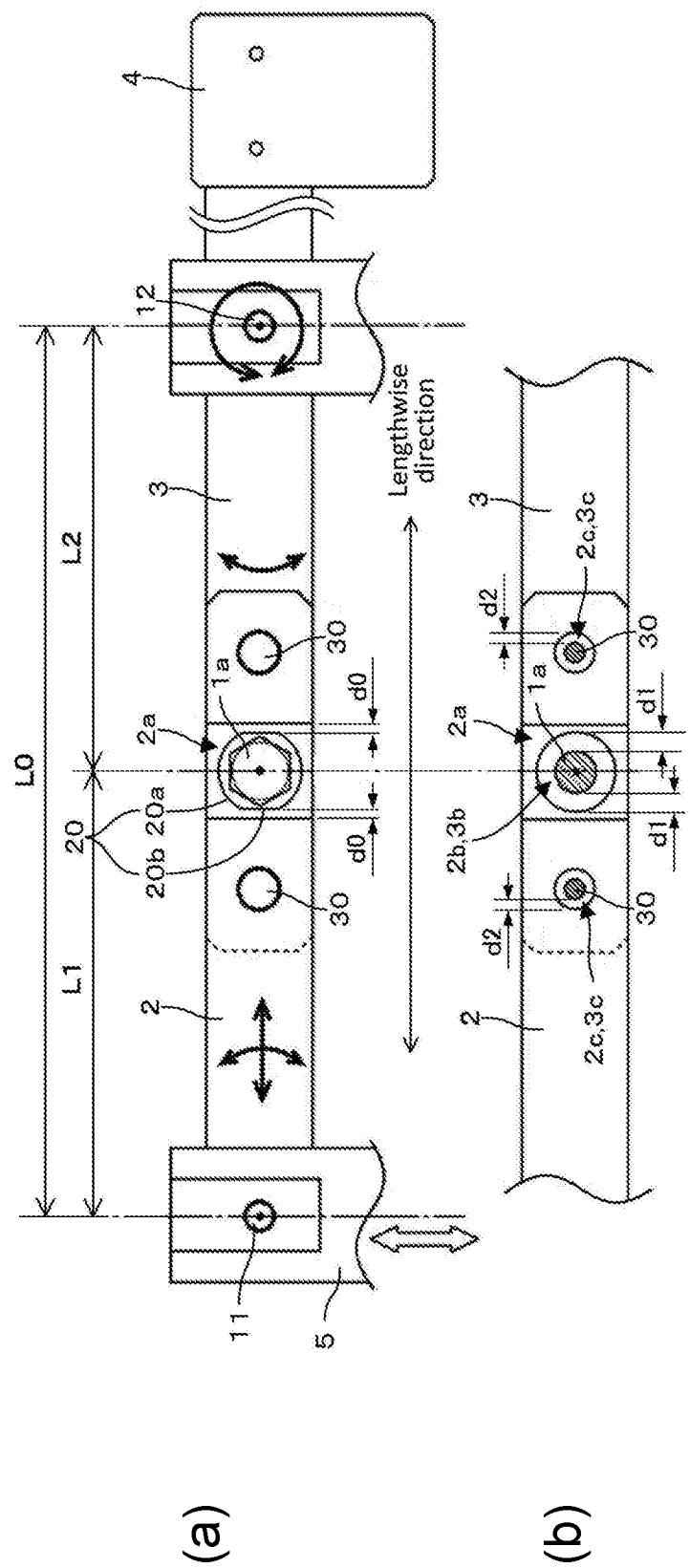
FIG. 16 is a composite view seen in a direction of arrow B in FIG. 15, in which part (b) shows part(a) with a head of a bolt 1a and a washer 20 removed.
Figure 17:
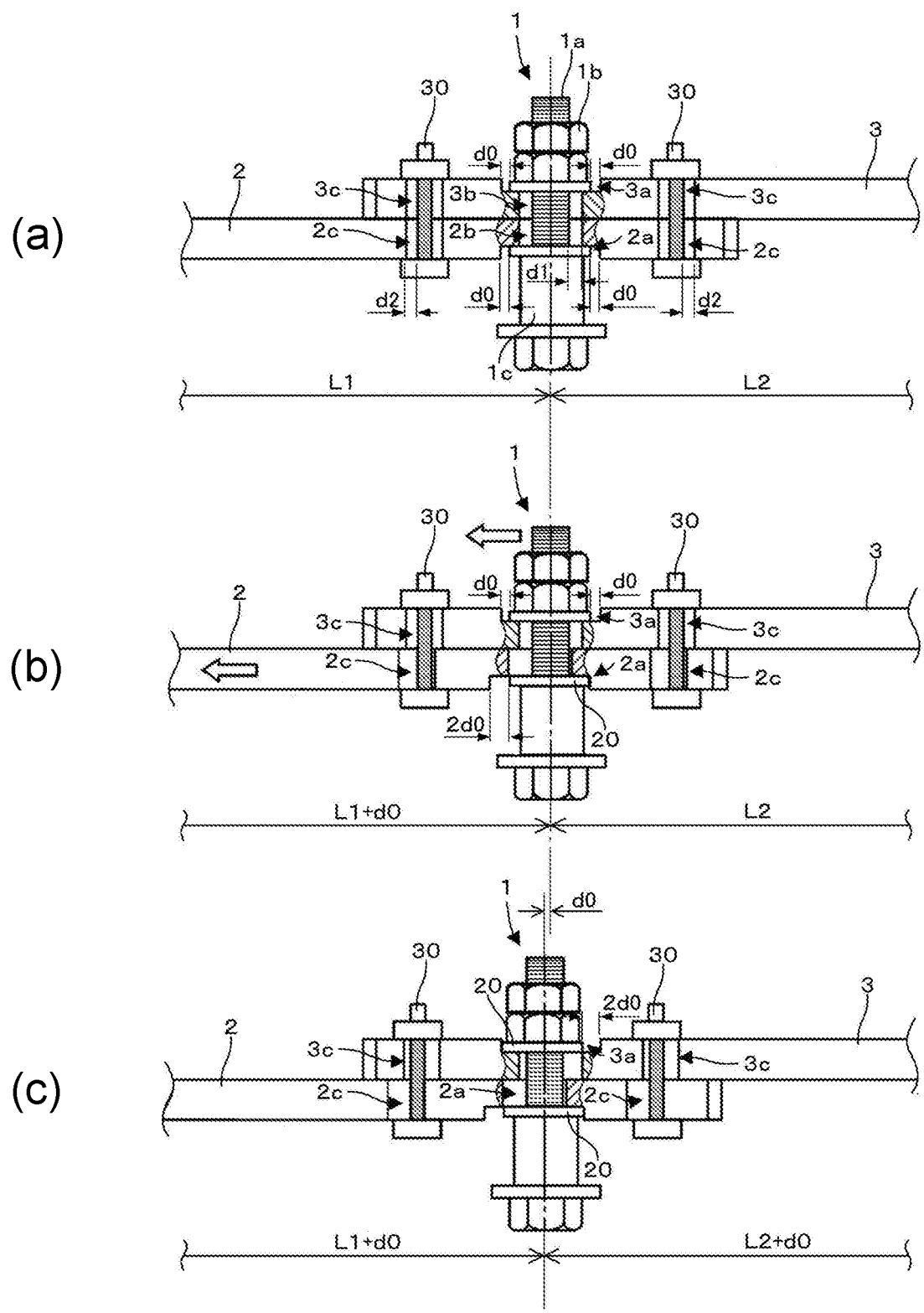
FIG. 17 is an explanatory view showing a relationship between relative positions of a test piece, an excitation arm and a weight attachment arm in a lengthwise direction.

The above explained looseness vibration tester, with which the looseness test for the present invention was conducted, is a tester proposed by the present inventors (Japan Patent No. 638,121) and is not a known technology at the time of filing the present application, so a summary of the tester will be explained below. FIG. 14 is a three-dimensional external view showing a looseness vibration tester 50 with which the above looseness test was conducted. FIG. 15 is a partial enlarged view of a part A in FIG. 14, FIG. 16 is a view seen in a direction of arrow B in FIG. 15, where part(b) is a view in which a head of a bolt 1*a* and a washer 20 are removed from part(a). FIG. 17 is an explanatory view showing a relation of relative positions of a test piece, an excitation arm and a weight attachment arm along a lengthwise direction.

This looseness vibration tester 50 is composed so as to load a bolt and nut 1 for the test (referred to as a "fastening screw structure" below) with vibration perpendicular to an axis, vibration about the axis (vibration with angular acceleration) and vibration along the axis. In contrast, it is possible to load a bolt and nut for the test only with vibration perpendicular to the axis in a case of a NAS impact vibration tester or a Junker vibration tester conventionally used. Further, the looseness vibration tester 50 is composed so as to conduct real time measurement of variation in axial force (lowering axial force) in a bolt of the fastening screw structure 1 when longitudinal vibration (frequency of vibration) is imparted to an excitation arm 2 of the two arms (an excitation arm 2, a weight attachment arm 3) fastened with the fastening screw structure 1.

With the composition of this looseness vibration tester 50, a two layered plate shaped excitation arm 2 and a weight attachment arm 3, as members to be fastened, are fixed with a fastening screw structure 1 as a test piece. Then, the excitation arm 2 and the weight attachment arm 3, as members to be fastened, are driven mechanically to conduct the looseness test of the fastening screw structure 1. The looseness vibration tester 50 comprises an excitation arm 2 for loading the fastening screw structure 1 with a predetermined vibration and a weight attachment arm 3 as well as a driving mechanism for driving the excitation arm 2 and the weight attachment arm 3 to be vibrated.

In general, a main portion of this looseness vibration tester comprises a weight 4 attached to the weight attachment arm 3, an activating shaft 5 connected to the excitation arm 2 for reciprocating motion (single vibration) in a predetermined stroke, and a cylinder 6 for supporting the activating shaft 5 longitudinally and causing it to slide longitudinally, etc. A crank mechanism causes the activating shaft 5 to reciprocate. The crank mechanism comprises a crank 7 converting a rotating motion into a reciprocating motion, a crank shaft 8 as a rotating shaft of the crank 7, a motor 9 generating rotational power for causing the activating shaft 5 to reciprocate, and a pulley 10 transmitting the rotational power of the motor 9 to the crank shaft 8, etc. One end of the excitation arm 2 is connected to an upper end of the activating shaft 5 with a connecting shaft 11. The weight attachment arm 3 swings (in a seesaw motion) around a swing shaft 12. The swing shaft 12 is supported by a main body with a bearing supporting member 13 for rotatable support. The looseness vibration tester 50 is composed so as to provide, beside these driving mechanisms, a computer PC (not shown) for processing and displaying data relating to the axial force of a bolt of a fastening screw structure 1, and a torque sensor (not shown) for measuring fastening torque to the fastening screw structure 1, etc.

As shown in FIG. 15, the fastening screw structure 1 comprises a bolt 1*a* and two nuts 1*b*, 1*b* screwed onto the bolt 1*a* (so called double nuts). Between the bolt 1*a* and a nut 1*b*, the excitation arm 2 and the weight attachment arm 3 as members to be fastened, washers 20 for causing axial force of a bolt (a fastening force) by the fastening screw structure 1 to be applied in a wide area (for equalization of contact) and a load cell 1c for measuring axial force of a bolt (fastening force) of the fastening screw structure 1 are provided. The excitation arm 2 and the weight attachment arm 3 are fastened in a parallel joined state by the fastening screw structure 1 via the washer 20, 20 with a predetermined fastening torque. A concave portion 2a is formed on the excitation arm 2 at a site for the bolt 1a to be attached thereto. Similarly, a concave portion 3a is formed on the weight attachment arm 3 at a site for the nut 1b to be attached thereto.

Further, rotatable swing restraining pins 30, 30 passing through the excitation arm 2 and the weight attachment arm 3 are provided on both sides of the fastening screw structure 1, respectively. While details are explained later referring to FIG. 16, a bending angle of the excitation arm 2 and the weight attachment arm 3 is restrained below a predetermined angle by the swing restraining pins 30, 30. As shown in FIG. 16(a), both sides of the washers 20 are cut off in straight lines and the washers have a shape in which circular portions 20a and straight line portions 20b are connected alternately each other. Further, a gap d0 (referred to as a "washer gap d0" below) is formed between the straight line portion 20b and the concave portion 2a. A material of the washer is, for example, S45C (carbon steel material) with an HRC (hardness) of 45 to 50, upon which a surface treatment is applied to form a tri-iron tetroxide film on the surface.

Further, as shown in FIG. 16(b), through-holes for the bolt 2b, 3b are formed in the respective concave portions 2a, 3a of the excitation arm 2 and the weight attachment arm 3. There is a gap (allowance) d1 (referred to as "bolt allowance d1" below) between the through-holes for the bolt 2b, 3b and the bolt 1a. Similarly, through-holes for the pin 2c, 3c allowing the swing restraining pins 30, 30 to pass through are formed on both sides of the respective concave portions 2a, 3a. There is a gap (allowance) d2 (referred to as "pin allowance d2" below) between the through-holes for the pin 2c, 3c and the swing restraining pin 30. Other than these, there are allowances between the activating shaft 5 and the connecting shaft 11, between the swing shaft 12 and the bearing supporting member 13, and between the washer 20 and the bolt 1a, etc. For convenience of the following explanation, the bolt allowance d1≥the pin allowance d2≥the washer gap d0, and a mechanical allowance other than the washer gap d0, the bolt allowance d1 and the pin allowance d2 will not be considered.

Consequently, when the activating shaft 5 reciprocates up and down (moves in single vibration), the excitation arm 2 can move leftward-rightward relative to the fastening screw structure 1 by a washer gap d0 in a lengthwise direction of itself as well as swing up and down by a pin allowance d2 around the connecting shaft 11 as a fulcrum. On the other hand, although the weight attachment arm 3 cannot move relative to the fastening screw structure 1 in a lengthwise direction of itself, it can swing up and down by a pin allowance d2 around the swing shaft 12 as a fulcrum. The fastening screw structure 1 can move leftward-rightward by a washer gap d0 relative to the weight attachment arm 3 in a lengthwise direction as well as move up and down by a bolt allowance d1. Due to this, the excitation arm 2 can move relative to the weight attachment arm 3 by 2d0 at maximum in a lengthwise direction of itself.

Further, the weight attachment arm 3 is usually forced to be rotated in a clockwise direction as shown in FIG. 16 by the weight 4. Consequently, when the activating shaft 5 reverses a direction of movement, a swinging of the excitation arm 2 or a swinging of the weight attachment arm 3 is reversed or stopped forcibly. In this case, the fastening screw structure 1 is loaded with an impact force in a direction perpendicular to the axis (referred to "impact force perpendicular to axis" below) via the excitation arm 2 or with an impact moment in a direction around the axis via the weight attachment arm 3. Furthermore, in a case where there is a long distance from the swing shaft 12 to the weight 4, the fastening screw structure 1 is loaded with an impact force in an axial direction via the weight attachment arm 3 when the activating shaft 5 reverses direction of movement.

The activating shaft 5 makes a reciprocating motion in a longitudinal (vertical) direction at a predetermined stroke (e.g., 11 mm). The excitation arm 2, in conjunction with this, is shifted relative to the fastening screw structure 1 in a lengthwise direction which is leftward-rightward in FIG. 16, while swinging up and down with the connecting shaft 11 as a fulcrum. On the other hand, the weight attachment arm 3, working together with reciprocating motion of the activating shaft 5, swings (in a seesaw motion) around the swing shaft 12 (a fixed point) as a fulcrum. A stroke of the activating shaft 5 is set so that the excitation arm 2 has a maximum relative movement in the lengthwise direction relative to the weight attachment arm 3 when the activating shaft 5 attains a lowermost point. In this case, the fastening screw structure 1 is loaded with an impact force perpendicular to the axis via the excitation arm 2 and also with an impact moment in a direction around the axis by the weight 4 via the weight attachment arm 3. In this, a state where the connecting shaft 11 and the swing shaft 12 are at a same height will be referred to as a "neutral state" below.

In a similar manner, when a sum (L1+L2) of a distance L1 between the bolt 1a and the connecting shaft 11 and a distance L2 between the bolt 1a and the swing shaft 12 is at a maximum, the fastening screw structure 1 (bolt 1a) is loaded with an impact force perpendicular to the axis via the excitation arm 2. At the same time, the fastening screw structure 1 (bolt 1a) is loaded with an impact moment in a direction around the axis via the weight attachment arm 3. In this, it will be referred to as a "vibration perpendicular to the axis" below when an impact force perpendicular to the axis is repeatedly loaded through the excitation arm 2. Further, it will be referred to as a "vibration around the axis" or a "vibration of an angular acceleration around the axis" below when an impact moment in a direction around the axis by the weight 4 is repeatedly loaded through the weight attachment arm 3. Furthermore, a sum of a distance L1 between the bolt 1a and the connecting shaft 11 and a distance L2 between the bolt 1a and the swing shaft 12 in a neutral state is to be L0.

Returning to FIG. 14 again, a three-phase AC motor, for example, can be used as the motor 9. In this case, a rotation frequency of the motor 9 is controlled by an inverter. FIG. 17 is an explanatory view showing a relation of relative positions of the fastening screw structure 1, the excitation arm 2 and the weight attachment arm 3 in a lengthwise direction. Part(a) shows these relative positions in a neutral state. Part(b) shows these relative positions when the excitation arm 2 has moved by a washer gap d0 relative to the fastening screw structure 1 in the lengthwise direction. Part(c) shows these relative positions when the excitation arm 2 has moved by 2d0 in the lengthwise direction.

As shown in part(a) of FIG. 17, a washer gap d0 is provided between each of the concave portions 2a, 3a and each of the washers 20, 20 respectively. On the other hand, a bolt allowance d1 is provided between the bolt 1a and the excitation arm 2 or the weight attachment arm 3, respectively. Further, a pin gap d2 is provided between the swing restraining pin 30 and the excitation arm 2 or the weight attachment arm 3, respectively.

As shown in part(b) of FIG. 17, when the activating shaft 5 (shown in FIG. 16) begins moving downward, the excitation arm 2 moves leftward as shown relative to the fastening screw structure 1 in the lengthwise direction. In this case, the washer gap d0≤the bolt allowance d1 and the pin gap d2, so that the washer on the bolt head side abuts the inner wall of the concave portion 2a of the excitation arm 2. As a result, the washer 20 is pushed by the inner wall of the concave portion 2a of the excitation arm 2, so that the excitation arm 2 and the fastening screw structure 1 integrally begin moving leftward as shown relative to the weight attachment arm 3. In this case, a distance between the bolt and the connecting shaft becomes L1+d0.

As shown in part(c) of FIG. 17, the excitation arm 2 and the fastening screw structure 1 integrally move leftward as shown relative to the weight attachment arm 3, so that the washer nut 20 on the nut 1 side abuts the inner wall of the concave portion 3a. Then, when the activating shaft 5 (in FIG. 16) attains a lowermost point, relative moving of the excitation arm 2 and the weight attachment arm 3 is forcibly stopped. That is, a momentum of the excitation arm 2 is forced to be zero and, along with this, an angular momentum of the weight attachment arm 3 is forced to be zero, in a state where the weight attachment arm 3 is loaded with the weight 4. As a result, the fastening screw arm 1 (bolt 1a) is loaded with an impact force perpendicular to the axis via the excitation arm 2 and at the same time the fastening screw structure 1 (bolt 1a) is loaded with an impact moment around the axis by the weight 4 via the weight attachment arm 3. In this case, a distance between the bolt 1a and the swing shaft 12 becomes L2+d0 in a state where a distance between the bolt 1a and the connecting shaft 11 is maintained to be L1+d0.

[Result of Screw Looseness Test]

Figure 8B:
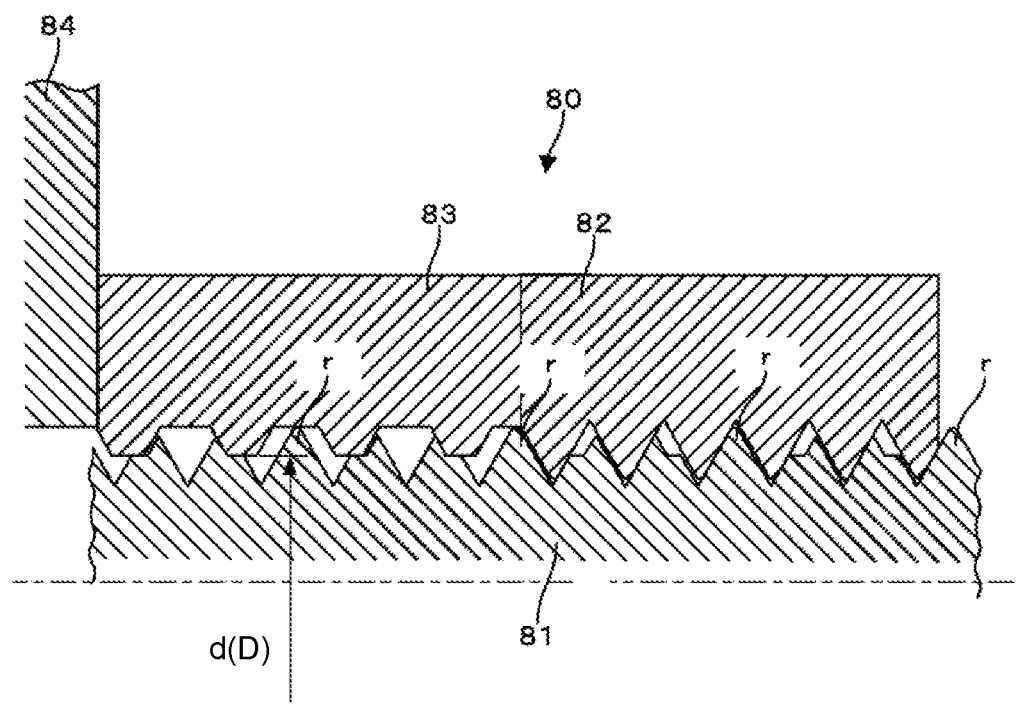

Returning to the above explained, what causes looseness to occur in a fastening structure with a looseness preventing nut disclosed in Patent Document 1 is considered as follows, as shown in a result of vibration test. That is, even if a root diameter between the ridges of hill-like second thread ridges $r_s$, $r_{s1}$-$r_{s6}$ is made to be the same as an effective diameter d of a first thread (S1) as shown in FIGS. 4(a) to 4(e), a rigidity of the hill-like second thread ridges $r_s$, $r_{s1}$-$r_{s6}$ with an enlarged root diameter between the ridges is lower than a rigidity of a first thread ridge r of a first thread (S1). Consequently, it is considered that, if the looseness vibration test of a screw as explained above is conducted for a fastening structure 80 as shown in FIG. 8b1 in which a first nut 82 is fastened onto a hexagon head bolt 81 with a high fastening torque, the hill-like second thread ridges $r_s$, $r_{s1}$-$r_{s6}$ undergo elastic deformation to lower an axial force.

[Explanation of the Dual-Threaded Screw Structure According to Embodiments of the Present Invention]

Figure 9A:
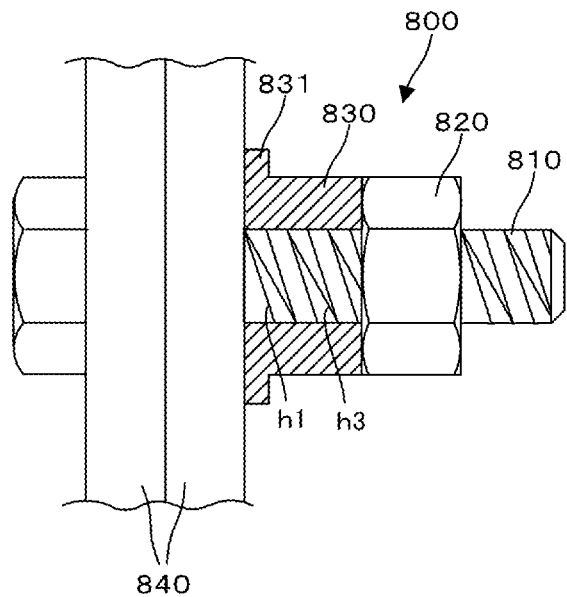
FIG. 9(a) is a view showing an example of a dual-threaded screw structure according to the present invention (raised more than an effective diameter) applied to a fastening structure fastened with double nuts.
Figure 9B:
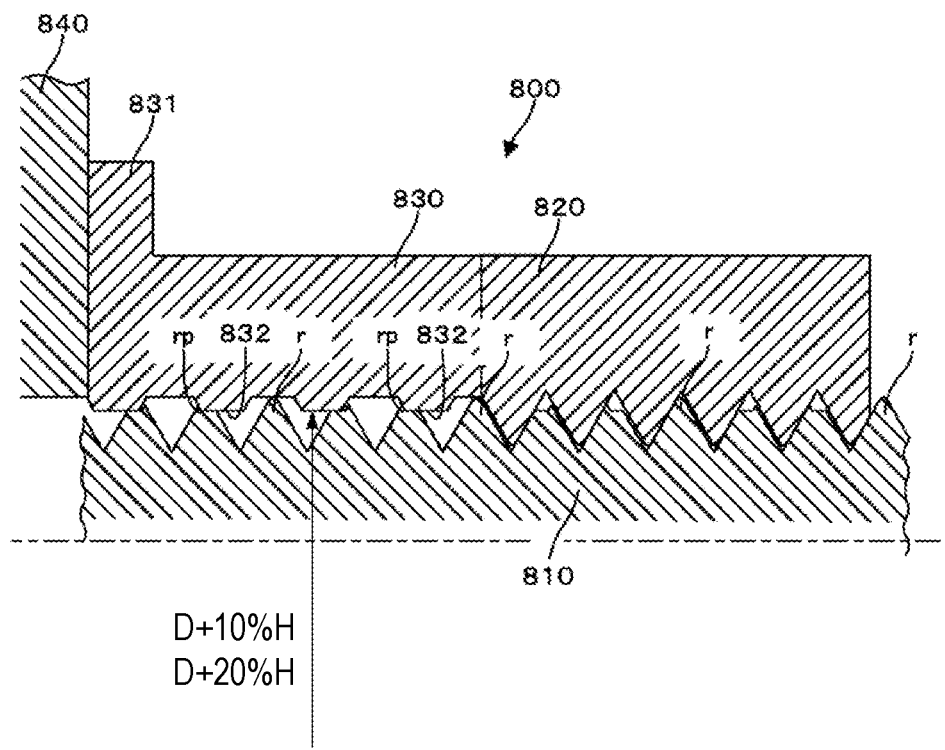
FIG. 9(b) is a sectional view showing the fastening structure shown in FIG. 9(a).
Figure 9C:
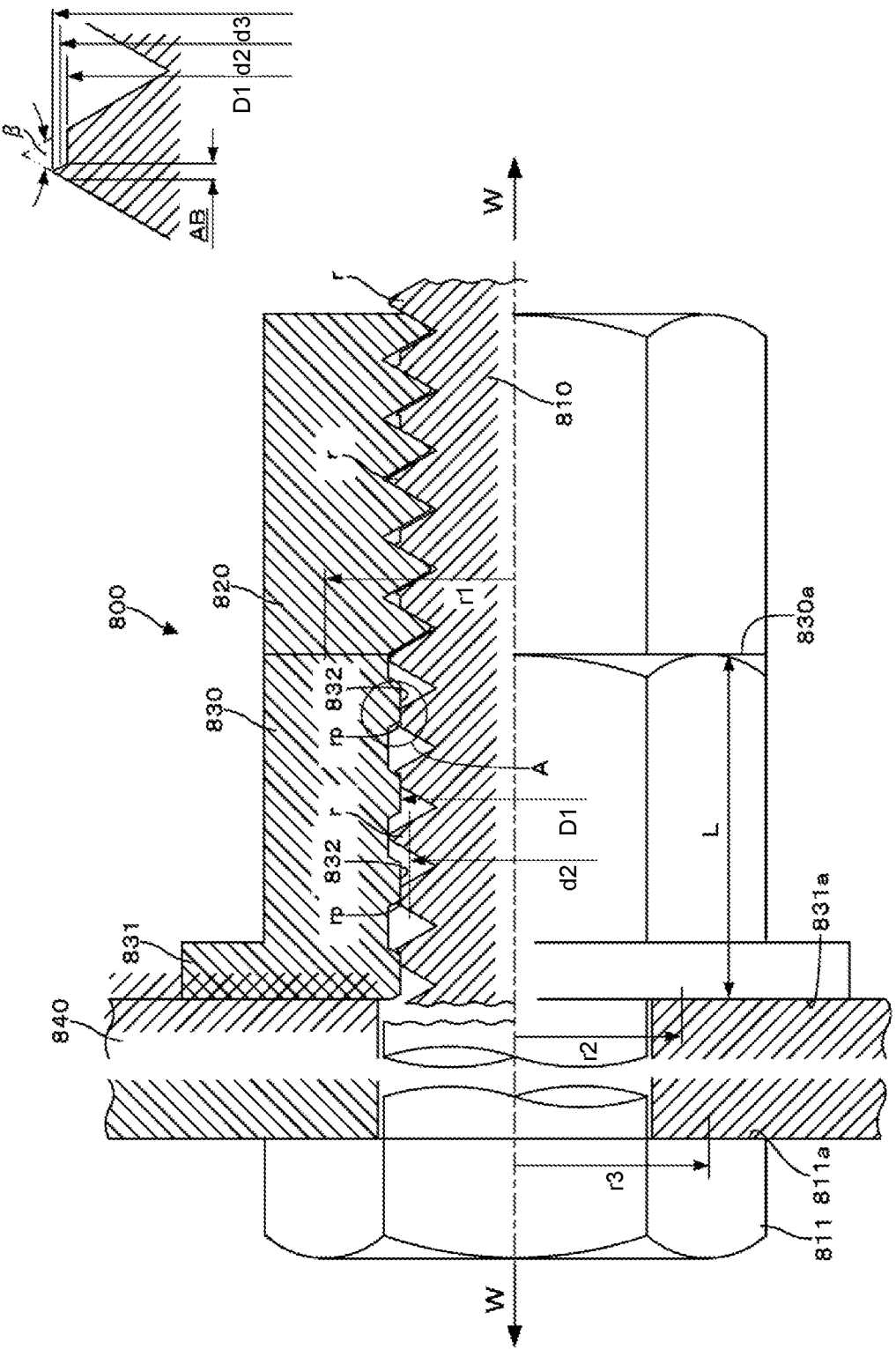
FIG. 9(c) is an explanatory sectional view for explaining a principle of loosening of double locking nuts.

As explained above, in a case where a fastening structure with double nuts having conventional structure is loaded with a severe loosening load, a possibility of lowering an axial force cannot be denied. From this, with the dual-threaded screw structures 1A according to embodiments of the present invention, a root diameter between the ridges of the hill-like second thread ridges $r_s$, $r_{s1}$-$r_{s6}$ is formed to be larger than an effective diameter d of a first thread (S1) as shown in FIGS. 5(a) to 7(e). FIGS. 9(a) to 9(c) show an example in which a dual-threaded screw structure according to an embodiment of the present invention is applied to a fastening structure 800 with a looseness preventing nut, in which FIG. 9(a) is a partial sectional view and FIG. 9(b) is a sectional view showing the dual-threaded structure engaged with nuts. As shown in FIG. 9(b), also the inner diameter ($D_1$) of the internal thread of a second nut 830 as a looseness preventing nut is formed to be larger than the effective diameter d of the first thread (S1).

FIGS. 5(a) to 5(e) show an example in which a root diameter between the ridges of the hill-like second thread ridges $r_s$, $r_{s1}$-$r_{s6}$ is formed to be larger by 10% than an effective diameter d of a first thread (S1). In this case, also for the inner diameter of the internal thread of a second nut 830 as a looseness preventing nut, a root diameter of a second thread is formed to be larger than the effective diameter d of the first thread (S1) by 10%. Here, a root diameter of a second thread formed to be larger by 10% is such that, taking the height of a ridge of the first thread to be H (a height by supposing an isosceles triangle; see FIG. 5(a)), the root diameter of the second thread is raised by h for a radius (2h for a diameter) as h=H×10%. A root diameter of a second thread that is formed to be larger by 20% or 30% than the effective diameter can be obtained by calculating in a similar manner.

Further, FIGS. 6(a) to 6(e) show an example in which a root diameter between the ridges of the hill-like second thread ridges $r_s$, $r_{s1}$-$r_{s6}$ is formed to be larger by 20% of the height H of the ridge (a height by supposing an isosceles triangle) than an effective diameter d of a first thread (S1). In this case, also the inner diameter ($D_1$) of the internal thread of the second nut 830 as a looseness preventing nut is formed to be larger by 20% of the height of the ridge than the effective diameter d of the first thread (S1). Further, FIGS. 7(a) to 7(e) show an example in which a root diameter between the ridges of the hill-like second thread ridges $r_s$, $r_{s1}$-$r_{s6}$ is formed to be larger by 30% than an effective diameter d of a first thread (S1). In this case, also the inner diameter ($D_1$) of the internal thread of the second nut 830 as a looseness preventing nut is formed to be larger by 30% of the height of the ridge than the effective diameter d of the first thread (S1). FIGS. 9(a) to 9(c) show a fastening structure 800 of a hexagon head bolt 810 in which a root diameter between the ridges of the hill-like second thread ridges $r_s$, $r_{s1}$-$r_{s6}$ is formed to be larger by 10% or 20% of the height H of the ridge than an effective diameter d of a first thread (S1) with looseness preventing nuts used as double nuts. A second nut 830 (a looseness preventing nut) having an internal thread is screwed onto the second thread (S2) at first.

Next, a first nut 820 (a fastening nut) having an internal thread 820 is screwed onto the first thread (S1) (a metric coarse thread) with a predetermined fastening torque. At this time, the second nut 830 is rotated further with a rotation of the first nut 820 to be fastened onto a member to be fastened 840. The second nut 830 is not unfastened in principle in this embodiment. The inner diameter of the second nut 830 is formed to be larger by 10% or 20% of the height H of the ridge than an effective diameter d of the first thread (S1). The second nut 830 has a flange 831 with a large diameter formed on the surface abutting the member to be fastened 840, thus being a nut having a flange in this embodiment. A locking force between the first nut 820 and the second nut 830 can be raised by forming a flange 831, thus lowering the possibility of looseness. FIG. 9(b) shows a section of FIG. 6(c) at an angular position of 45°.

As shown in FIG. 9(b), the inner diameter ($D_1$) of the internal thread of the second nut 830 is formed to be larger the effective diameter d of the first thread (S1), so that straight line portions 832 in a sectional shape, that is, a spiral circular bore, are formed in the inner diameter ($D_1$) of the internal thread of the second nut 830. Further, a plurality of small ridges rp having a height variable corresponding to angular positions (see FIGS. 5(*a*) to 5(*e*), FIGS. 6(*a*) to 6(*e*), and FIG. 9(*b*)) are formed on the peak of the second thread (S2). As a result, the internal thread of the second nut 830 is engaged with the small ridge rp on the top of the second thread (S2), so that a contact area of the internal thread of the second nut 830 with the second thread (S2) decreases, thus raising a contact pressure per unit area of the thread surface. However, as the fastening force is shared by the first nut 820 in the dual-threaded screw structure of the present invention, there is no problem. A function of the second nut 830 is not to provide a fastening force, but the nut has the function of preventing looseness of the first nut 820. Consequently, shear breaking of the second nut 830 and small ridges never occurs.

[Looseness Test of a Dual-Threaded Screw Structure]

Looseness tests of the dual-threaded screw structure according to embodiments of the present invention were conducted with the above explained looseness vibration tester 50, and data has been obtained as shown in FIGS. 11 to 13. This data has been obtained by conducting tests ten times for each of the test pieces 1 to 3, in a similar manner as the result of vibration test shown in FIG. 10. Further, the conditions of the tests were similar to the vibration test shown in FIG. 10, with a vibration frequency of 35 Hz, a test time of 29 seconds and a fastening torque of the first nut of 42 Nm. Furthermore, chromium molybdenum steel material (SCM material) used as a standardized material of bolts and nuts is employed for these fastening structure, for which tests have been conducted. The data shown in FIG. 11 was obtained for a dual-threaded screw structure in which a root diameter between the ridges of second thread ridges is formed to be larger by 10% of the height H of the ridge (when a basic thread of the second thread is taken as an isosceles triangle) than an effective diameter d of the first thread (S1). Here, the first thread is a metric coarse thread with a nominal diameter of 12 mm and the second thread is a two-threaded coarse thread having a three-times lead and with a shape of the ridge being the same as a that of the metric coarse thread (in a sectional plane perpendicular to the spiral line and the tangent line).

The looseness test was conducted after the first nut was fastened with a torque of 42 Nm before the test (the axial force at this time was taken as 100%). The data shown in FIG. 11 was obtained for a dual-threaded screw structure in which a root diameter between the ridges of second thread ridges is formed to be larger by 10% of the height H of the ridge than an effective diameter d of a first thread (S1). With the data, the axial force was high, with a maximum of 19.8 KN for ten times of looseness tests, and the axial force was in a range of 10.7 KN to 19.8 KN. In the data, variation was smaller than the conventional test shown in FIG. 10 and the residual axial force was high, at 69 to 89%, indicating that looseness did not occur compared with the prior art explained above. The data shown in FIG. 12 is similar for a dual-threaded screw structure in which a height of a root diameter of the second thread is formed to be larger by 20% than an effective diameter d of a first thread (S1). In FIG. 12, the axial force was high, with a maximum of 18.8 KN, the axial force was in a range of 10.4 KN to 18.8 KN with a variation smaller than the conventional one shown in FIG. 10, and residual axial force was high, at 68 to 92%, indicating that looseness did not occur.

Similarly, FIG. 13 shows data when the height H of a root diameter of the second thread ridges is increased by 30%. With the data shown in FIG. 13, an axial force became zero in the sixth test for the test piece 1, hill-like ridges of the second thread underwent plastic deformation, and the axial force became zero with repeated loads of six times. This seems to be caused as follows. That is, the larger than the effective diameter d of the first thread (S1) the root diameter between ridges of the hill-like thread ridges of the second thread (S2) is formed to be, the nearer to a primary rigidity of the first thread ridge r of the first thread (S1) becomes a rigidity of the first thread (S1) with a larger root diameter between the ridges, so that a strength between the first nut 820 and the first thread (S1), that is, shearing stress in the hill-like ridges, is within an allowable range or elastic deformation of the threads is within an allowable range, thus never creating a problem. However, as shown for angular positions of 22.5° and 67.5° in FIGS. 7(*a*) and 7(*d*), respectively, only ridges rq that are still smaller than the small ridges rp as shown in FIGS. 5(*b*) to 5(*d*) and 6(*b*) to 6(*d*) are formed in a large number at the top of the ridge of the second thread (S2) with a root diameter formed to be larger by 30%.

As a result, only the small ridges rq at the top of the ridge of the second thread (S2) are engaged with the second nut, so that a contact area of the internal thread of the second nut with the second thread (S2) decreases. This is caused by the occurrence of shear breaking or plastic deformation of the small ridges rq when the dual-threaded screw structure undergoing a looseness test is loaded with high loads (axial force or fastening torque) in this state. The phenomena of such breaking or plastic deformation was recognized also by observing test pieces. The results of the tests explained above exhibit that while making the root diameter of the thread ridges of the second thread larger is effective for holding an axial force when the shank of a screw or a nut is loaded with a load of torque, it is not effective when the load of torque exceeds a predetermined value.

[Principle of Fastening with Double Nuts for a Dual-Threaded Screw Structure]

The principle of fastening with double nuts for a dual-threaded screw structure according to the present invention will be explained, taking a fastening structure with a looseness preventing nut fastened by double locking nuts as shown in FIG. 9(*c*) as an example. A torque T necessary for rotating a second nut 830 under an axial force W is generally given by the following equation (1).

$$T = W(d_2/2)\tan(\alpha + \rho') \qquad (1)$$

Here, W is an axial force of the dual-threaded screw structure 810, $\rho'$ is a friction angle of a contact surface with which the second thread contacts with the second nut, $d_2$ is an effective diameter of thread surface with which the second thread contacts with the second nut and a is a lead angle of the second thread.

In this, the effective diameter $d_2$ of the ridge of the second thread (ridge with which the second thread 830 contacts) is taken as a height averaged for half of the height of the ridge as the height varies depending on the angular position. Further, when the root diameter of the second thread is the same as an inner diameter $D_1$ of the second nut, the effective diameter $d_2$ equals a value obtained by dividing a sum of an outer diameter $d_3$ of the ridge and the inner diameter $D_1$ of the second thread by 2 (see FIG. 9(*c*)).

A torque $T_1$ after the seat 831*a* of the second nut 830 has contacted the member to be fastened 840 is generally given by the following equation (2).

$$T_1 = W[(d_2/2)\cdot\tan(\alpha + \rho') + r_2 \cdot \tan\rho] \qquad (2)$$

Here, $r_2$ is an averaged radius of the seat 831a with which the second nut 830 contacts with the member to be fastened 840, $\alpha$ is a lead angle of the second thread and $\rho$ is a friction angle of the seat 831a with a friction coefficient $\mu$.

On the other hand, when the fastening structure 800 is fastened, the second nut 830 is fastened, being driven to be rotated indirectly by rotating the first nut 820. At this time, the second nut 830 is rotated by a friction force of the seat 830a with which the first nut 820 contacts with the second nut 830. A torque $T_1'$ with which the second nut 830 is driven to be rotated by this rotation of the first nut 820 is given by the following equation (3), in a case where the friction coefficient $\mu$ is same as that of the seat 831a of the second nut 830.

$$T_1' = \tan\rho \cdot W \cdot r_1 \quad (3)$$

Here, $r_1$ is an averaged radius of the seat 830a with which the first nut 820 contacts with the second nut 830 and $\rho$ is the friction angle of the seat 831a with the friction coefficient $\mu$ ($\mu=\tan\rho$).

In this case, in order to obtain a locking force between the first nut 820 and the second nut 830 by rotation of the first nut 820 alone with a predetermined fastening torque, the operation must be done as follows. It is required that the second nut 830 is rotated by rotating the first nut 820 at first, then the seat 831a of the flange 831 of the second nut 830 contacts with the member to be fastened 840 and the rotation of the second nut 830 is ceased by a friction force of the seat 831a in the next step, after which the first nut 820 is fastened with a predetermined torque, thus creating a mutual locking force for preventing the looseness of this fastening structure 800.

In order that the rotation of the second nut 830 is ceased after it has contacted the member to be fastened 840, the following condition is necessary to be established.

$$T_1 > T_1'$$

$$T_1 = W[(d_2/2)\cdot\tan(\alpha+\rho') + r_2\cdot\tan\rho] > T_1' = \tan\rho\cdot W\cdot r_1 \quad (4)$$

Therefore, $$[(d_2/2)\cdot\tan(\alpha+\rho') + r_2\cdot\tan\rho] > \tan\rho\cdot r_1 \quad (5)$$

With this condition established and only by fastening the first nut 820 with a torque of such a predetermined value that the ridges of the second thread do not undergo plastic deformation with shear stress or contact pressure as explained later, it is not necessary with the present invention to unscrew the second nut 830 and impart the locking force, but the required locking force can be obtained, considering the results of looseness vibration tests explained above.

[Observation of Looseness of Double Nuts in Use of a Dual-Threaded Screw Structure]

With the repeated rotation torque by the looseness vibration tester 50 explained above, the mechanism for creating the looseness of a screw is considered as follows. The condition required for the ridges shown in FIGS. 7(a) to 7(e), for example, in the fastening structure 800 shown in FIG. 9(a) to undergo plastic deformation will be explained. As shown in FIG. 17, etc., as external forces causing looseness to occur in a fastening screw structure 1 in tests with a vibration tester 50 of screw looseness, a repeated swinging motion of an excitation arm 2 rotates a bolt 1a via its contact seat, or a repeated swinging motion of a weight attachment arm 3 rotates a seat of the nut 1b to create looseness in the fastening screw structure 1. Further, from a result obtained by observing the test pieces, it was observed that the ridges rq underwent plastic deformation when looseness occurred.

[Breaking or Deformation of Thread Ridges by Shear Force]

(1) Torque from a Second Nut 830

From review of driving to loosen with external force in a vibration tester 50 of screw looseness and of results of the tests, a reason for looseness of the fastening structure 800 with a looseness preventing nut will be explained referring to FIG. 9(c), etc. It is considered that looseness in the fastening structure 800 is caused by a second nut 830 or a dual-threaded screw structure 810 driving a member to be fastened 840 to be rotated. In this, when the fastening structure 800 is fastened with an axial force W and the second nut 830 with a high lead is rotated from the side of the member to be fastened 840, the following torque $T_2$ is created via a seat 831a.

$$T_2 = W\cdot\tan\rho\cdot r_2 \quad (6)$$

Here, $r_2$ is the averaged radius of the seat 831a with which the second nut 830 contacts the member to be fastened 840, and $\rho$ is a friction angle of the seat 831a ($\mu=\tan\rho$). When the torque $T_2$ is created by the external force, the following axial force $W_1$ is created. From the above explained equation (1), $$W_1 = T_2/(d_2/2)\cdot\tan(\alpha+\rho') \quad (7)$$

Here, $\rho'$ is a friction angle of a contact surface with which the second nut with friction coefficient $\mu$ contacts the ridge, $d_2$ is an effective diameter of thread surface with which the second thread contacts with the second nut, and $\alpha$ is a lead angle of the second thread.

(2) Torque of Loosening from the Side of a Head Portion 811 of a Dual-Threaded Screw Structure 810

In the above explained looseness vibration tests, the external force on the ridges rp of the fastening structure 800 is not only a torque from the second nut 830, but the member to be fastened 840 is rotated from the side of a seat 811a of a head portion 811 0f the dual-threaded screw structure 810 with a torque $T_3$ rotating the member 840 in a fastening direction or in a loosening direction (the second nut 830 side). This torque $T_3$ creates an axial force $W_2$. In a similar manner as the above equation (6), $$T_3 = W\cdot\tan\rho\cdot r_3 \quad (8)$$

Here, $r_3$ is an averaged radius of the seat 811a with which the head portion 811 of the dual-threaded screw structure 810 contacts the member to be fastened 840 and $\rho$ is a friction angle of the seat 811a=$\tan\rho$).

With this torque $T_3$, the following axial force $W_2$ is created.

$$W_2 = T_3/(d_2/2)\cdot\tan(\alpha+\rho') \quad (9)$$

Here, $d_2$ is an effective diameter of the thread surface with which the second thread contacts the second nut and $\rho'$ is a friction angle of a contact surface of ridges with which the second nut contacts, in a case of friction coefficient $\mu$.

(3) Shear Stress Created in Ridges of the Second Thread

On the other hand, a condition for a ridge of the rotated bolt 1a (a thread ridge with which the second nut contacts) to undergo shear breaking is considered as follows.

As a flank angle is 60° for a metric coarse thread, a mean shearing length per a ridge $\underline{AB}$ becomes as follows from an equation for obtaining a base side of an isosceles triangle (see the enlarged view of A in FIG. 9(c)).

$$\underline{AB} = (d_3 - D_1)\tan(\beta/2) \quad (10)$$

Here, $d_3$ is an outer diameter of the ridge, $D_1$ is an inner diameter of the second nut and β is a flank angle of the thread ridge.

In this, as a mean shearing length AB varies depending on an angular position, a mean value may be used for calculation.

Then, taking an allowable axial load when a ridge of the dual-threaded screw structure 810 undergoes shear breaking or plastic deformation as $W_B$, the following equation is obtained, as "$\pi D_1 ABz$" is an area where the ridge is loaded with a shear load.

$$W_B = \pi D_1 \underline{AB} z \tau \quad (11)$$

Here, τ is an allowable shear breaking stress of a material of the dual-threaded screw structure 810, $D_1$ is an inner diameter of the nut 830 and z is a number of ridges taken as ones having ability of being loaded. In this, as z can be obtained by calculation when a length L of the second nut is given, and also an allowable axial load $W_B$ can be calculated.

[Reason for Looseness in Fastening Structure with Dual-Threaded Screw Structure Fastened with Double Nuts]

In the above explained looseness tests, the head portion 811 of the dual-threaded screw structure 810 shown in FIG. 9(c) abuts the member to be fastened 840 via the seat 811a and the second nut 830 having a high lead is driven to be rotated in a direction of fastening or loosening the member to be fastened 840. That is, torques are imparted simultaneously to the fastening structure 800 via the seat 831a of the second nut 830 and via the seat 811a of the head portion 811 of the dual-threaded screw structure 810 from the side of the member to be fastened 840. When torques are created simultaneously in both directions of fastening and loosening the member to be fastened 840 with the looseness tester 50, what can be said from the results of the tests is that the ridges go beyond an allowable elastic deformation to undergo plastic deformation.

In the above explained looseness tests, a maximum axial force Wm of the axial force imparted simultaneously to the member to be fastened 840 by both of the dual-threaded structure 810 and the second nut 830 becomes a sum of an axial force W in the equation (2), an axial force $W_1$ in the equation (7) and an axial force $W_2$ in the equation (9), taking an axial force before the fastening structure 800 is loaded with an external force as W.

$$W_m = W + W_1 + W_2 \quad (12)$$

In this, taking an allowable axial load for the second thread in the dual-threaded screw structure 810 as $W_B$, the following relationship is necessary, in which $W_B$ is an allowable shear breaking load determined by the effective sectional area A of the second thread and τ is calculated using the equation (11).

$$Wm = W + W_1 + W_2 < W_B = \pi D_1 \underline{AB} z \tau \quad (13)$$

If this relation is maintained, at least looseness due to shear breaking of a ridge with a rotation torque from a member to be fastened 840 does not occur. From this, when the ridges rq shown in FIGS. 7(b) and 7(d) undergo plastic deformation or deformation over an allowable elastic deformation, locking force is lost such that the structure loosens.

(4) Plastic Deformation Due to Contact Surface Pressure of a Second Thread

Loosening the structure via the looseness vibration tester 50 was explained concerning shear breaking of the ridges or deformation due to shearing stress. However, with the actual thread ridges, even when contact pressure acting on the thread surface exceeds an allowable value through screwing a nut and thread ridges, plastic deformation of the ridges occurs. Under a maximum load of an axial force Wm, the following contact surface pressure is created on the ridges of a second thread ridge.

$$W_3 \leq (\pi/4)(D_3^2 - D_1^2) z q \quad (14)$$

Here, $D_3$ is an outer diameter of a second thread ridge, $D_1$ is an inner diameter of a second nut 830, z is a number of ridges in the second thread and second nut contacting each other and q is an allowable contact surface pressure per unit area.

If this equation (14) is not satisfied, the second thread ridge undergoes plastic deformation. The contact surface pressure created due to contact pressure of the ridges due to the maximum load Wm given by the above equation (13) must be no more than the allowable contact surface pressure q. Consequently, for the ridges not to undergo plastic deformation due to contact pressure, the following equation is necessary to be satisfied.

$$Wm < W_3 \quad (15)$$

In general, the above explained allowable shearing stress is a stress expressed by "allowable shearing stress=shear breaking stress/safety factor" and means a stress that can be used safely in designing. The allowable contact surface pressure is similar. On the other hand, such deformation is called elastic deformation that, while a body is deformed when it is loaded with a load, an amount of deformation decreases corresponding to a gradual decrease of the load and the body returns to be of an initial shape and dimension when the load is removed. With the present invention, also shearing stress within this elastic deformation means an allowable shearing stress or an allowable contact surface pressure.

As explained above, judging from the test results and the above consideration of the results, the result was such that, while it is preferable to make a second thread to have root diameter larger than an effective diameter of the first thread by an amount below 30%, the fastening force is lowered when the root diameter exceeds this. On the other hand, observing test pieces in which the root diameter exceeds 30% of an effective diameter of the first thread, it was found that the ridge rq shown in FIGS. 7(b) and 7(d) has undergone plastic deformation. A reason for this is such that, when a second nut 830 abutting a member to be fastened is rotated with a high torque in a direction of fastening or loosening the member to be fastened, the ridge rq with a low strength shown in FIGS. 7(b) and 7(d) undergoes plastic deformation, thus exceeding an allowable elastic deformation. Consequently, as the ridge undergoes plastic deformation, a locking force between the first nut and the second nut is not recovered.

[Fastening Structure with a Dual-Threaded Screw Structure]

The fastening structure with a dual-threaded screw structure explained above referring to FIGS. 9(a) to 9(c) has been explained for examples using dual-threaded screw structures having a root diameter larger than the effective diameter of the first thread (S1). However, the dual-threaded screw structure used in the fastening structure is not limited to this. That is, as is understood with the above tests and explanation thereof, it was found that looseness occurs in a fastening structure with double nuts by deformation of the ridges of the second thread due to shearing stress and contact surface pressure via a surface with which the ridges of a second thread (S2) contact a second nut. Consequently, in the fastening with double nuts of a dual-threaded screw structure in which two kinds of threads, consisting of a first thread and a second thread having a lead larger than the first thread, are formed, it can be said that a fastening force is highest in a range in which the ridges of the second thread (S2) are not deformed with stress from the second nut, that is, in a range of allowable stress.

The dual-threaded screw structure used in a fastening structure with a dual-threaded screw structure according to the present invention is not limited to a dual-threaded screw structure with a root diameter of a second thread (S2) larger than an effective diameter of a first thread (S1). That is, it is only necessary that the second thread has a strength such that a stress imparted to the ridges of the second thread from the second nut is in a range of allowable shearing stress and allowable contact surface pressure of the ridges of the second thread (S2), when an axial force is created in the dual-threaded screw structure with a rotation torque externally imparted to the second nut and, if stress exceeds the allowable range, plastic deformation is created. When the first nut screwed onto the first thread is rotated to be fastened, an axial force is created in the dual-threaded screw structure. An axial force by fastening with the first nut or by an external force does not become higher than a highest allowable axial force (stress) of the dual-threaded screw structure in designing. When an axial force created in a dual-threaded screw structure is a maximum allowable axial force, also shearing stress and contact surface pressure in the thread ridges of the second thread must be of an allowable shearing stress and allowable contact surface pressure, respectively.

Within a range of allowable maximum axial force in designing, when a shearing stress and a contact pressure with which the ridges of the second thread are loaded are of an allowable shearing stress and an allowable contact pressure, respectively, the fastening structure with a dual-threaded screw structure according to the present invention is not loosened. That is, when fastening can be performed with a maximum fastening force of the dual-threaded screw and is within the range, loosening never occurs. As understood from the above explanation, the dual-threaded screw structure used in the fastening structure with a dual-threaded screw structure according to the present invention is not limited to one in which a root diameter of a second thread (S2) is larger than an effective diameter of a first thread (S1). A root diameter of a second thread (S2) may be smaller or larger than an effective diameter of a first thread (S1), if the above condition is satisfied

[Method for Manufacturing Dual-Thread Screw Structure]

The dual-threaded screw structure 1A according to embodiments of the present invention can be manufactured through working by machining, rolling or injection molding, working by 3-D printer (3-D forming), metal injection molding (MIM), lost-wax casting, etc. In a case where thread ridges are worked through a common rolling, such as when an unevenness of thread ridges of a second thread (S2) is small in the dual-threaded screw structure according to the present invention, rolling is easy and a lifetime of the thread rolling dies becomes long, which is preferable. Particularly, because a root diameter of a second thread (S2) can be large, it is possible that localized high pressure in grooved portions of the second thread (S2) can be restrained when rolling with a thread rolling cylindrical die. Hence, unnatural plastic deformation is avoided and surface scale-like peeling that can be a problem in rolling does not occur so easily.

Other Embodiments

In the dual-threaded screw structure and the fastening structure that includes the dual-threaded screw structure, a sectional shape of the thread ridge of the first thread is a one-threaded metric coarse thread and the second thread (S2) is a metric coarse thread having thread ridges the same as this, and embodiments of a thread with a large lead or pitch have been explained above. That is, the first thread (S1) and the second thread (S2) are metric coarse threads having a same kind of sectional shape of thread ridges. However, the present invention is not limited to these embodiments and it goes without saying that modification is possible within a range that is not deviated from the objectives or gist of the present invention. The thread ridge may be a Whitworth thread, a unified thread, a trapezoidal thread, a pipe thread, a round thread, a ball thread or an angular thread. Further, for example, a dual-threaded screw structure may be one with a combination of a first thread (S1) of a two-threaded thread and a second thread (S2) of a two-threaded thread having a four-times lead, one with a combination of a first thread (S1) of a two-threaded thread having a three-times lead and a second thread (S2) of a two-threaded thread having a four-times lead, etc. In other words, this dual-threaded screw structure may be one in which basic thread ridges or thread ridges in a shape near to basic thread ridges can be formed continuously or at each angular position around an axial line of the shank of the screw.

Further, while it has been explained regarding the above embodiments that leads of the first thread and second thread are of an integer multiple of a lead of a metric coarse thread, the lead may not be of an integer multiple. For example, a lead of the second thread (S2) may be of a multiple of such as 3.1 of a metric coarse thread. Further, a lead of the first thread (S1) may be of a multiple of such as 1.1 of a metric coarse thread. That is, this dual-threaded screw structure may be one in which basic thread ridges or thread ridges in a shape near to basic thread ridges can be formed continuously or at each angular position around an axial line of the shank of the screw. Further, while the above explained thread ridges of the first thread and the second thread are those of a metric coarse thread with a triangular sectional shape, the thread ridges may have a trapezoidal, rectangular or circular sectional shape. That is, the thread ridges may be of a sectional shape used in a trapezoidal thread, a pipe thread, a circular thread, a ball thread or an angular thread.

While the first thread (S1) and the second thread (S2) are of a metric thread, a Whitworth thread, a unified thread, a trapezoidal thread, a pipe thread, a round thread, a ball thread or an angular thread, the thread ridges may be ones with a substantially same, similar or analogous sectional shape as these, for example, ones modified such that angular portions are chamfered or interpolated with an arc. The present invention treats these modified threads as the same.

INDUSTRIAL APPLICABILITY

With the dual-threaded screw structure and fastening structure that includes the dual-threaded screw structure according to the present invention, sufficient strength can be obtained and the possibility of looseness is extremely low. Thus, these structures can be employed as fastening structures, lead cam assemblies, etc., in infrastructures such as roads, bridges, railroads, etc., and moving machines such as automobiles, household electrical appliances, etc. Further, while the above explanation concerns mainly fastening structures using double nuts, the dual-threaded screw structure can be used also as two cam feeding assemblies with various speeds, as can be understood from the explanation. Consequently, the technical field is not limited to a fastening structure.

EXPLANATION OF REFERENCE CHARACTERS 1A dual-threaded screw structure
2A dual-threaded portion
3A shank
80, 800 fastening structure with a looseness preventing nut
81, 810 hexagon head bolt
82, 820 first nut
83, 830 second nut
831 flange
832 straight line portion
84, 840 member to be fastened
r first thread ridge
$r_s$, $r_{s1}$-$r_{s6}$ hill-like second thread ridge
rp, rq ridge
1 fastening screw structure
1a bolt
1b nut
1c load cell
2 excitation arm
2a concave portion
2b through-hole for bolt
2c through-hole for pin
3 weight attachment arm
3a concave portion
3b through-hole for bolt
3c through-hole for pin
4 weight
5 activating shaft
6 cylinder
7 crank
8 crank shaft
9 motor
10 pulley
11 connecting shaft
12 swing shaft
13 bearing supporting member
20 washer
20a circular portion
20b straight line portion
30 swing restraining pin
50 looseness vibration tester

What is claimed is:

1. A dual-threaded screw structure having two kinds of threads formed on a shank, the two kinds of threads comprising:
   a first thread including one or more threads of a kind selected from a metric thread, a Whitworth thread, a unified thread, a trapezoidal thread, a pipe thread, a round thread, a ball thread, and an angular thread; and
   a second thread having a lead larger than the first thread,
   wherein a root diameter of the second thread is larger than an effective diameter of the first thread and smaller than an outer diameter of the first thread.

2. The dual-threaded screw structure according to claim 1, wherein the first thread is a one-threaded thread, and the second thread is a one-threaded thread or a multiple-threaded thread.

3. The dual-threaded screw structure according to claim 1, wherein the second thread is a same kind of thread as the first thread.

4. The dual-threaded screw structure according to claim 1, wherein the root diameter of the second thread is larger in radius than the effective diameter of the first thread by less than 30% of a height of a ridge of the first thread.

5. The dual-threaded screw structure according to claim 1, wherein the root diameter of the second thread is larger in radius than the effective diameter of the first thread by 10 to 20% of a height of a ridge of the first thread.

6. A fastening structure with a dual-threaded screw structure comprising:
   the dual-threaded screw structure having two kinds of threads formed on a shank, the two kinds of threads being a first thread including one or more threads of a kind selected from a metric thread, a Whitworth thread, a unified thread, a trapezoidal thread, a pipe thread, a round thread, a ball thread, and an angular thread, and a second thread having a lead larger than the first thread;
   a first nut screwed onto the first thread; and
   a second nut screwed onto the second thread,
   wherein the dual-threaded screw structure has a strength such that a stress imparted to ridges of the second thread of the dual-threaded screw structure from the second nut is in a range of allowable shearing stress and allowable contact surface pressure of the ridges of the second thread when an allowable maximum axial force is created between the dual-threaded screw structure and the second nut with a rotation torque externally imparted to the dual-threaded screw structure and the second nut.

7. The fastening structure with a dual-threaded screw structure according to claim 6,
   wherein a root diameter of the second thread is larger than an effective diameter of the first thread and smaller than an outer diameter of the first thread, in a sectional shape including an axis line of the shank.

8. The fastening structure with a dual-threaded screw structure according to claim 6,
   wherein the equation $$[(d_2/2)\cdot\tan(\alpha+\rho')-r_2\cdot\tan\rho] > \tan\rho\cdot r_1$$

is satisfied when the first nut is rotated when $\tan\rho$ is equal to a friction coefficient $\mu$, $\rho'$ is a friction angle of a contact surface with which the second thread contacts the second nut, $r_2$ is an averaged radius of a seat with which the nut contacts a member to be fastened, $d_2$ is an effective diameter of a thread surface with which the second thread contacts the second nut, $\alpha$ is a lead angle of the second thread, and $r_1$ is an averaged radius of a seat with which the first nut contacts the second nut.

9. The fastening structure with a dual-threaded screw structure according to claim 6,
   wherein one or more of an irregularity, a flange, and a rough surface is formed on a surface of the second nut contacting the member to be fastened.

* * * * *

UNITED STATES PATENT AND TRADEMARK OFFICE
CERTIFICATE OF CORRECTION

PATENT NO. : 11,293,476 B2
APPLICATION NO. : 16/621981
DATED : April 5, 2022
INVENTOR(S) : Toshinaka Shinbutsu et al.

It is certified that error appears in the above-identified patent and that said Letters Patent is hereby corrected as shown below:

In the Claims

Column 24, Line 48, delete "$[(d_2/2) \cdot \tan(\alpha+\rho')-r_2 \cdot \tan\rho] > \tan\rho \cdot r_1$" and insert --$[(d_2/2) \cdot \tan(\alpha+\rho')+r_2 \cdot \tan\rho] > \tan\rho \cdot r_1$--

Signed and Sealed this
Thirty-first Day of May, 2022

Katherine Kelly Vidal
*Director of the United States Patent and Trademark Office*